United States Patent
Yagita

(12) 
(10) Patent No.: US 6,654,137 B1
(45) Date of Patent: Nov. 25, 2003

(54) PRINT SYSTEM, SERVER, INFORMATION PROCESSING APPARATUS, PRINT CONTROL METHOD, AND RECORDING MEDIUM

(75) Inventor: Takashi Yagita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/261,501

(22) Filed: Mar. 3, 1999

(30) Foreign Application Priority Data

Mar. 5, 1998 (JP) .......................................... 10-069227
Jan. 22, 1999 (JP) .......................................... 11-014171

(51) Int. Cl.[7] .......................... G05F 15/00; G05F 13/00
(52) U.S. Cl. ....................................... 358/1.15; 358/1.1
(58) Field of Search ............................... 358/1.14, 1.15

(56) References Cited

U.S. PATENT DOCUMENTS 5,625,757 A * 4/1997 Kageyama et al. ........ 358/1.14
5,768,483 A * 6/1998 Maniwa et al. ............ 358/1.14
6,205,363 B1 * 3/2001 Miyasaka et al. .............. 700/9
6,433,884 B1 * 8/2002 Kawakami ................. 358/1.15
2001/0028472 A1 * 10/2001 Mochizuki ................. 358/1.14

* cited by examiner

*Primary Examiner*—Edward Coles
*Assistant Examiner*—Alan Rahimi
(74) *Attorney, Agent, or Firm*—Fitzpatrick, Cella, Harper & Scinto

(57) ABSTRACT

A print system is provided which is capable of selecting a client to which detailed print information is transmitted from among a plurality of clients when a user performs manual-feed printing in a network environment. In a network print system, for example, when a manual-feed-specified print is specified, a command for a manual-feed-specified print is added to the header part of print data of a print job. Then, when a server obtains an offline state of a printer, the server notifies the client of the offline status. The client receiving the notification displays a dialogue which notifies the user of the timing at which manual feeding is performed. It is also possible to provide an event request of a manual-feed timing to an application.

51 Claims, 22 Drawing Sheets

PRINT SYSTEM, SERVER, INFORMATION PROCESSING APPARATUS, PRINT CONTROL METHOD, AND RECORDING MEDIUM

BACKGROUND OF THE INVENTION

1. Field of the Invention

The present invention relates to a print system, a server, an information processing apparatus, a print control method, and a recording medium when a printer connected in a network is used by a plurality of client computers.

2. Description of the Related Art

In recent years, the spread of personal computers in offices is remarkable, and network technologies for connecting them have been developed. In the conventional method of using printers, one printer is connected to one personal computer and is so used. Recently, the number of cases is increasing in which a printer is connected over a network and the printer is shared and used among personal computers connected over the network.

For an environment in which a network printer is used, in many cases, a network OS, such as NetWare or Windows NT (trademark), is used, and the network printer is used by setting a print server, and there is a need to newly set up a server to share the printer. When there is a server, such as a mail server, if the functions of a print server are added thereto, the functions of a conventional printer are decreased. In order for a client computer to confirm the status of a transmitted print job, it is necessary to inquire, from the client computer, the print server or the printer of the information for the print job.

In a conventional print system in such a network environment, when a user performs a manual-feed-specified print, it cannot be determined from which client computer the manual-feed-specified print came, and it is not possible for the client computer to obtain information for manual feeding. It is also not possible for the application of the client computer to receive an event request for indicating the timing of manual feeding. Further, even when the application is not involved, it is not possible for the client machine to indicate the manual-feed timing to the user.

SUMMARY OF THE INVENTION

Accordingly, it is an object of the present invention to provide a print system which is capable of notifying a specific user of detailed print information when the user performs a manual-feed specification in a network environment, a server, an information processing apparatus, a print control method, and a recording medium.

According to one aspect, the present invention which achieves this object provides a server apparatus connected to a plurality of information processing apparatuses and a print apparatus over a network, the server apparatus comprising: information acquisition means for acquiring information from the print apparatus; determination means for determining an information processing apparatus to which information from the print apparatus is notified from among the plurality of information processing apparatuses on the basis of information obtained by the information acquisition means; and notification means for notifying the information processing apparatus determined by the determination means of the information from the print apparatus.

Preferably, the information acquisition means acquires information for print data received by the print apparatus and the status information of the print apparatus.

Preferably, when information indicating the offline state of the print apparatus is obtained, the notification means notifies the information processing apparatus of the information from the print apparatus.

Preferably, the server apparatus further comprises: job information receiving means for receiving job information for a print job from the information processing apparatus; and sending enable instruction means for instructing the information processing apparatus that has transmitted the job information to send the print data to the print apparatus when it is determined whether print data can be sent from the information processing apparatus to the print apparatus and it is determined that sending is possible.

Preferably, the server apparatus further comprises job information storage means for storing the received job information.

Preferably, the server apparatus further comprises sequence control means for controlling a printing sequence on the basis of the job information.

Preferably, the server apparatus further comprises: deletion instruction means for instructing that the print data held by the information processing apparatus be deleted, wherein, when a job for which printing has been terminated is notified from the print apparatus, the deletion instruction means instructs the information processing apparatus to delete the print data.

Preferably, when a job for which printing has been terminated is notified from the print apparatus, the job information of the print data stored in the job information storage means is deleted.

According to another aspect, the present invention which achieves this object provides an information processing apparatus connected to a server apparatus and a print apparatus over a network, the information processing apparatus comprising: notification receiving means for receiving information for the print apparatus notified from the server apparatus; event receiving means for receiving an event request from an application; and event issuing means for issuing an event to the application which has made an event request for the notified information.

Preferably, the information processing apparatus further comprises: addition means for adding to print data a command for causing the print apparatus to be placed in an offline state when the information processing apparatus creates the print data to be printed on a recording medium which is manually fed; and transmission means for transmitting the print data to the print apparatus.

Preferably, the event receiving means can accept an event request of a manual-feed timing from the application, and the event issuing means issues an event which notifies the manual-feed timing to the application which has made the event request of the manual-feed timing when the information from the print apparatus is notified by the server apparatus.

Preferably, the information processing apparatus further comprises: job information transmission means for transmitting job information for a print job to the server apparatus; and print data storage means for storing the print data after the job information is transmitted to the server apparatus by the transmission means, wherein when sending enable information which indicates that print data can be sent to the print apparatus is received from the server apparatus, the print data stored in the print data storage means is transmitted to the print apparatus.

Preferably, the information processing apparatus further comprises: selection means for selecting one of a first mode and a second mode in which printing is performed, when the print data is transmitted to a print apparatus capable of selecting one of the first mode in which when the print data to which is added a command for causing the print apparatus to be placed in an offline state is received, the print apparatus is always placed in an offline status, and the second mode in which when the print data to which is added a command for causing the print apparatus to be placed an offline state is received, the print apparatus is placed in an offline state when there is no recording medium in the manual-feed tray, and the print apparatus is not placed in an offline status and records on the recording medium when there is a recording medium in the manual-feed tray; and mode addition means for adding to the print data a command for causing the print apparatus to perform printing in a mode selected by the selection means.

Preferably, when the server apparatus is notified of a job for which printing is terminated from the print apparatus and deletion of the print data stored in the print data storage means is instructed from the server apparatus, the print data is deleted.

According to a further aspect, the present invention which achieves this object provides a print system comprising a server apparatus, an information processing apparatus, and a print apparatus which are connected over a network, wherein the server apparatus comprises: information acquisition means for acquiring information from the print apparatus; determination means for determining an information processing apparatus to which information from the print apparatus is notified from among the plurality of information processing apparatuses on the basis of information obtained by the information acquisition means; and notification means for notifying information from the print apparatus to the information processing apparatus determined by the determination means, and the information processing apparatus comprises event issuing means for issuing an event to the application which has made an event request for the information notified by the notification means is made.

Preferably, the information acquisition means acquires information for print data received by the print apparatus and the status information of the print apparatus.

Preferably, when information of a manual-feed timing of the print apparatus is notified by the server apparatus, the event issuing means issues an event which notifies the manual-feed timing to the application which has made an event request of the manual-feed timing.

Preferably, the information processing apparatus further comprises: addition means for adding to print data a command for causing the print apparatus to be placed in an offline state when the information processing apparatus creates print data to be printed on a recording medium which is manually fed; and transmission means for transmitting the print data to the print apparatus.

Preferably, the information processing apparatus further comprises: job information transmission means for transmitting job information for print data to the server apparatus; print data storage means for storing the print data corresponding to the job information transmitted from the transmission means; and print data transmission means for transmitting the print data to the print apparatus, and the server apparatus further comprises: job information receiving means for receiving the job information; and job information storage means for storing the received job information.

Preferably, the print apparatus comprises a first mode in which when print data to which is added a command for causing the print apparatus to be placed in an offline state is received from the information processing apparatus, the print apparatus is always placed in an offline state. Alternatively, the print apparatus comprises a second mode in which when the print data to which is added a command for causing the print apparatus to be placed in an offline state is received from the information processing apparatus, the print apparatus is placed in an offline status when there is no recording medium in the manual-feed tray, and the print apparatus is not placed in an offline state and records on the recording medium when there is a recording medium in the manual-feed tray. Alternatively, the print apparatus comprises a first mode in which when the print data to which is added a command for causing the print apparatus to be placed in an offline state is received from the information processing apparatus, the print apparatus is always placed in an offline-state, and a second mode in which whet the print data to which is added a command for causing the print apparatus to be placed an offline state is received, the print apparatus is placed in an offline status when there is no recording medium in the manual-feed tray, and the print apparatus is not placed in an offline state and records on the recording medium when there is a recording medium in the manual-feed tray, and one of the first and second modes can be selected.

Preferably, when information indicating an offline state of the print apparatus is obtained, the server apparatus notifies the information processing apparatus determined by the determination means of information of a manual-feed timing from the print apparatus.

Preferably, the server apparatus further comprises sequence control means for controlling a printing sequence on the basis of the job information.

Preferably, the server apparatus further comprises sending enable instruction means for sending, to the information processing apparatus having the print data, sending enable information when instructs that the print data be sent to print apparatus, when it is determined whether print data can be sent from the information processing apparatus to the print apparatus and it is determined that sending is possible, and the information processing apparatus transmits the print data stored in the print data storage means to the print apparatus when the sending enable information is received from the server apparatus.

Preferably, the server apparatus further comprises: deletion means for deleting the job information of the print data stored in the job information storage means when a job for which printing has been terminated is notified from the print apparatus; and deletion instruction means for instructing that the print data stored by the information processing apparatus be deleted, and the information processing apparatus deletes the print data stored in the job information storage means when deletion of the print data is instructed from the server apparatus.

In the foregoing, means constructed in the print system, the server, and the information processing apparatus have been described. In the present invention, the information processing apparatus may share a part or the entirety of the above-described construction. In addition, the present invention includes a print system control method, a server control method, an information processing apparatus control method, which are achieved by steps similar to those of the above-described means, and a recording medium in which a program of similar steps are recorded.

According to the present invention, the server apparatus is able to reliably notify only the information processing apparatus which is desired to be notified of information from the print apparatus from among a plurality of information processing apparatuses on the basis of information obtained from the print apparatus. Further, if the information from the print apparatus is information for print data received by the print apparatus and the status information of the print apparatus, it is possible to accurately determine in detail the information processing apparatus in which notification is desired and the notification contents.

When the status of the print apparatus varies and information regarding reaching an offline state is obtained, since the server apparatus notifies information from the print apparatus, the information processing apparatus is able to be informed of the offline state.

When the server apparatus receives job information from the information processing apparatus, it is possible to accurately determine whether or not print data can be transmitted on the basis of the job information and the information from the print apparatus and to send the print data. It is also possible to control the printing sequence on the basis of the received job information.

When the received job information is stored and used together with the information from the print apparatus, it is possible to accurately manage the status of the accepted print job. When the job information stored within the server apparatus is deleted, which has become unnecessary after the printing has been terminated, it is possible to reliably confirm that printing has been performed. When the printing is terminated, it is possible to instruct the deletion of the print data stored within the information processing apparatus.

According to the present invention, the information processing apparatus is able to receive information notified from the server apparatus and to issue an event to the application which has made the event request.

The information processing apparatus is able to cause the print apparatus to be placed in an offline state before a manual-feed print is performed and to stop printing by adding to the print data a command for causing the print apparatus to be placed in an offline state and transmitting it when the print data to be printed by manual feeding is generated. In addition, the timing of manual feeding can be notified to the user.

With respect to a print apparatus capable of selecting a first mode in which when print data to which is added a command for causing the print apparatus to be placed in an offline state is received, an offline state is always reached and a second mode in which when print data to which is added a command for causing the print apparatus to be placed in an offline state is received, the offline state is reached when there is no recording medium in the manual-feed tray, and an offline state is not reached and recording is performed on the recording medium when there is a recording medium in the manual-feed tray, the information processing apparatus is able to add to the print data a command for selecting one of the modes for performing printing and to send the print data.

The information processing apparatus need only transmit job information to the server apparatus, and transmits the print data directly to the print apparatus, making it possible to reduce traffic on the network. The information processing apparatus is able to reliably perform printing by storing print data until the printing is terminated.

According to the present invention, the print system is able to reliably notify only the information processing apparatus which is desired to be notified of the information from the print apparatus from among a plurality of information processing apparatuses on the basis of the information obtained from the print apparatus.

Furthermore, with respect to a print apparatus which is always placed in an offline state regardless of the status of the print apparatus when print data to which is added a command for causing the print apparatus to be placed in an offline state is going to be printed, or a print apparatus which is placed in an offline state when there is no recording medium in the manual-feed tray and, and which is not placed in an offline state and which records on a recording medium when there is a recording medium in the manual-feed tray, if the print apparatus reaches an offline status, that status can be notified to the user. Furthermore, with respect to a print apparatus comprising a first mode in which when print data to which is added a command for causing the print apparatus to be placed in an offline state is received, the print apparatus is always placed in an offline state and a second mode in which when print data to which is added a command for causing the print apparatus to to be placed in an offline state is received, the print apparatus is placed in an offline state when there is no recording medium in the manual-feed tray and, and the print apparatus is not placed in an offline state and records on a recording medium when there is a recording medium in the manual-feed tray, it is possible to select the mode for performing printing according to the request from the user.

According to the print system of the present invention, it is only necessary to transmit job information to the server apparatus, and the print data is transmitted directly to the print apparatus, making it possible to reduce traffic on the network. It is possible to control the printing sequence on the basis of the job information received from the information processing apparatus by the server apparatus. Furthermore, by storing print data in the information processing apparatus and storing job information in the server apparatus, and using these together with information from the print apparatus, it is possible to accurately manage the status of the accepted print job. Furthermore, by storing the job information in the server apparatus and storing print data in the information processing apparatus until printing is terminated, it is possible to reliably perform printing.

The above and further objects, aspects and novel features of the invention will become more apparent from the following detailed description when read in connection with the accompanying drawings.

DETAILED DESCRIPTION OF THE PREFERRED EMBODIMENTS

The preferred embodiments of the present invention will now be described below with reference to the accompanying drawings.

First Embodiment

An embodiment of a print system, a print method, and a recording medium according to the present invention is described below.

The print system of this embodiment is applied to a network print system.

Figure 1:
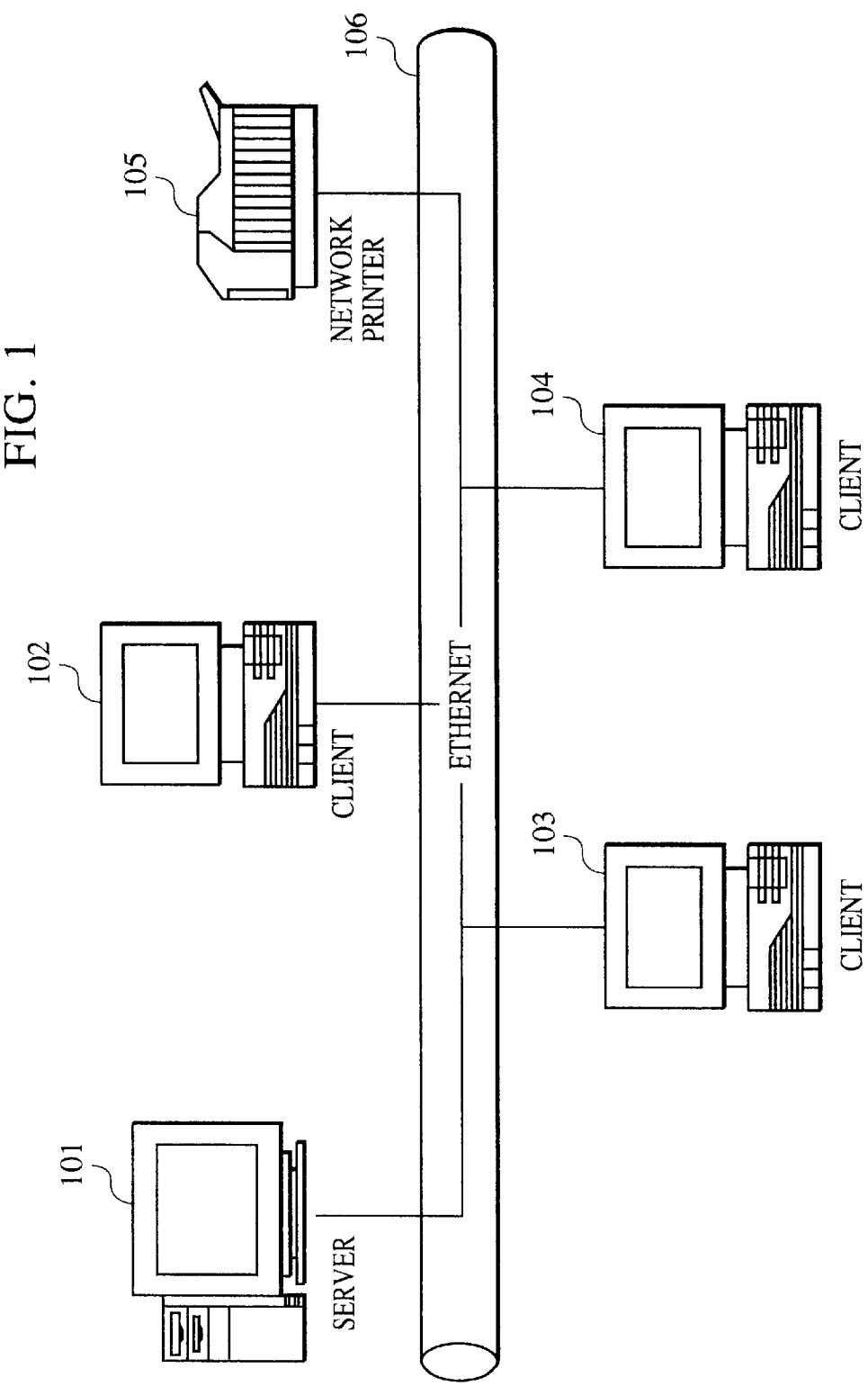
FIG. 1 shows the construction of a network print system to which a virtual server is applied.

FIG. 1 shows the construction of a network print system to which a virtual server is applied. In this network print system, it is assumed that n client computers are connected, and FIG. 1 shows a state in which three client computers are connected. Referring to FIG. 1, reference numerals 102, 103, and 104 each denotes a client computer (also simply referred to as a client), and these are connected to a network 106 through a network cable.

The client computers 102, 103, and 104 can execute various programs, such as application programs, and have incorporated therein a printer driver having the function of converting print data into a printer language corresponding to the printer. This printer driver supports a plurality of printer languages.

Reference numeral 101 denotes a server, connected to the network 106 through a network cable, which stores files used in the network and monitors the use state of the network 106.

The server 101 further has the function of storing job information of print data to which a print request is issued from the client computers (PCs) 102, 103, and 104 and notifying the client computer of IP (Internet Protocol) information of a network printer 105 and job information received in the buffer.

Reference numeral 105 denotes a network printer, connected to the network 106 through a network interface, which converts print data transmitted from the client computer into a dot image page by page, and prints it in units of page. Reference numeral 106 denotes a network in which the client computers 102, 103, and 104, the server 101, and the network printer 105 are connected to each other.

In this manner, the role is shared by the server 101, the client computers 102, 103, and 104, and the network printer 105, thereby effectively utilizing the client computers and performing processing of reducing the load of the network.

Figure 2:
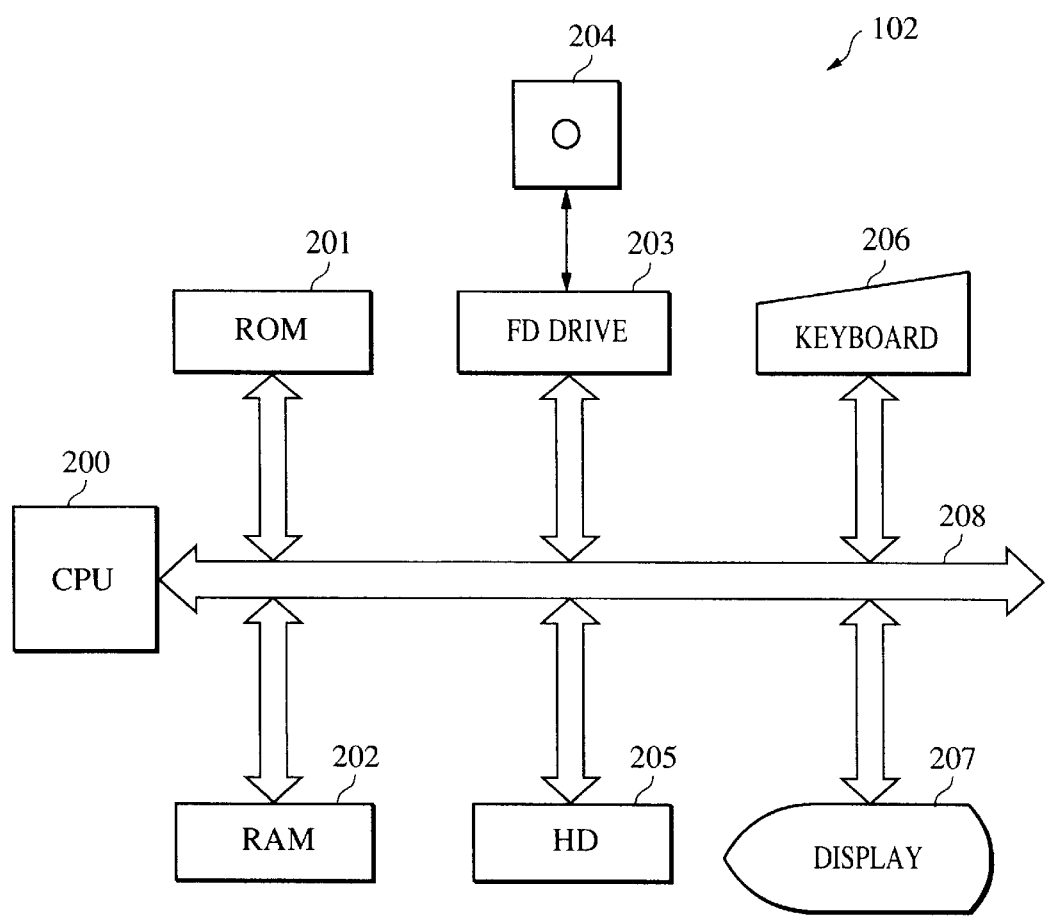
FIG. 2 is a block diagram schematically showing the construction of a client computer 102.

FIG. 2 is a block diagram schematically showing the construction of the client computer 102. The construction of the client computers 103 and 104 is the same as that of the client computer 102.

A CPU 200 executes application programs, printer driver programs, the operating system (OS), network print control programs, etc., which are stored in a HD (hard disk) 205, and performs control for temporarily storing information required to execute a program, a file, and the like in a RAM 202.

A ROM 201 has stored therein programs, such as basic I/O programs, font data used during document processing, and various data, such as data for a template. Reference numeral 202 denotes a RAM, which functions as a main memory, a work area, and the like for the CPU 200.

Figure 3:
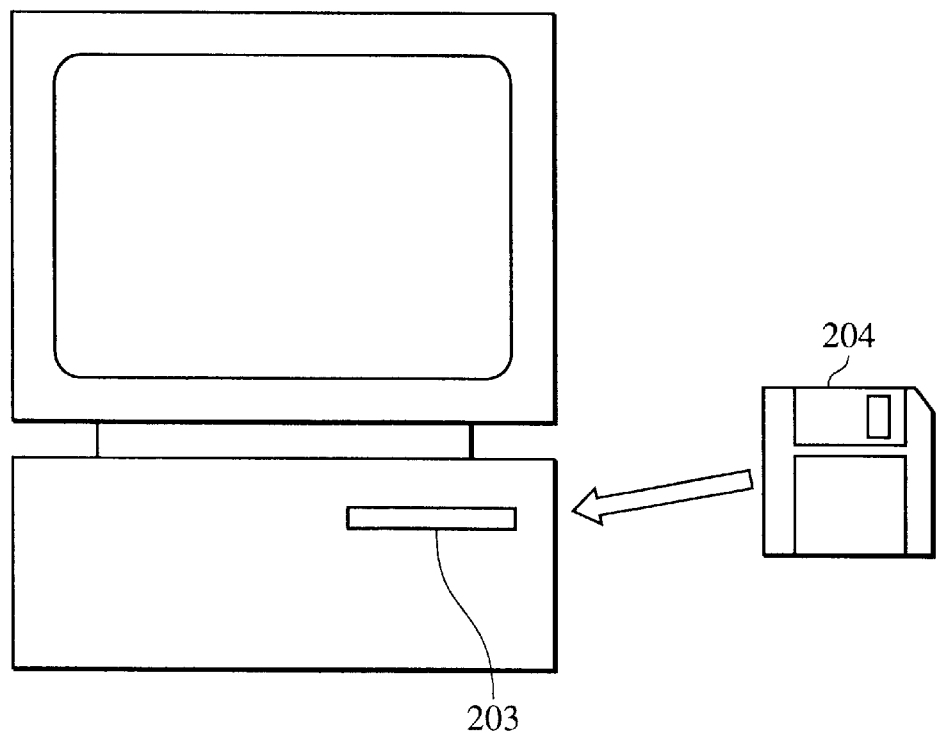
FIG. 3 shows a situation in which a program stored in a floppy disk is loaded into a computer system.

Reference numeral 203 denotes a FD (floppy disk) drive, through which a program stored in an FD 204 is loaded into a computer system. FIG. 3 shows a situation in which a program stored in a floppy disk is loaded into the computer system.

Figure 4:
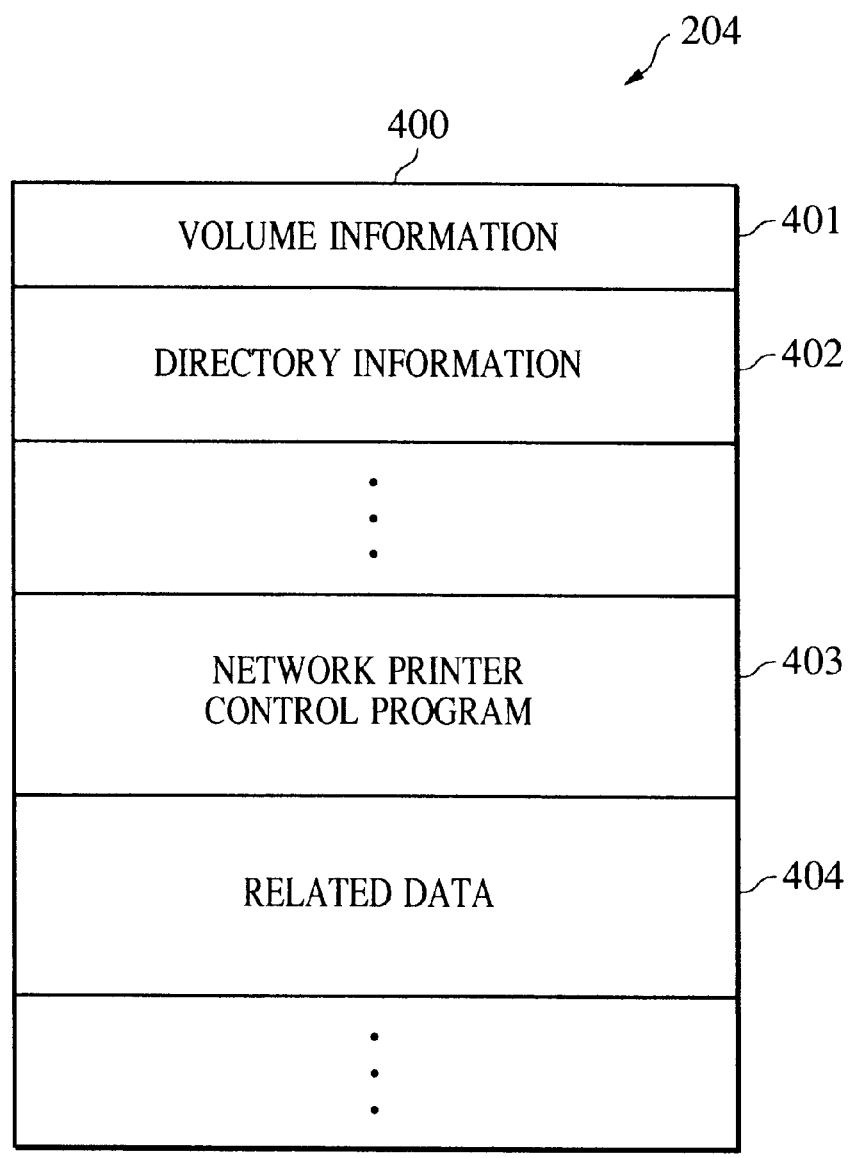
FIG. 4 shows the contents stored in a floppy disk 204.

Reference numeral 204 denotes an FD, which stores network print control programs and related data in this embodiment. FIG. 4 shows the contents stored in the floppy disk 204. Referring to FIG. 4, reference numeral 400 denotes data contents of the FD 204. Reference numeral 401 denotes volume information. Reference numeral 402 denotes directory information which indicates the data information. Reference numeral 403 denotes a network print control program. Reference numeral 404 denotes related data thereof. The network print control program 403 is program-coded in accordance with the flowchart of a network printer control procedure to be described later.

Referring back to FIG. 2, reference numeral 205 denotes a HD, in which application programs, printer driver programs, the OS, network print control programs, related data, and the like are stored. Reference numeral 206 denotes a keyboard, which is used in such a way that a user inputs and instructs a command, such as a device control command, to the client computer. Reference numeral 207 denotes a display, which displays a command input from the keyboard 206, the status of the printer, and the like. Reference numeral 208 denotes a system bus, which supervises the flow of data within the client computer.

Figure 5:
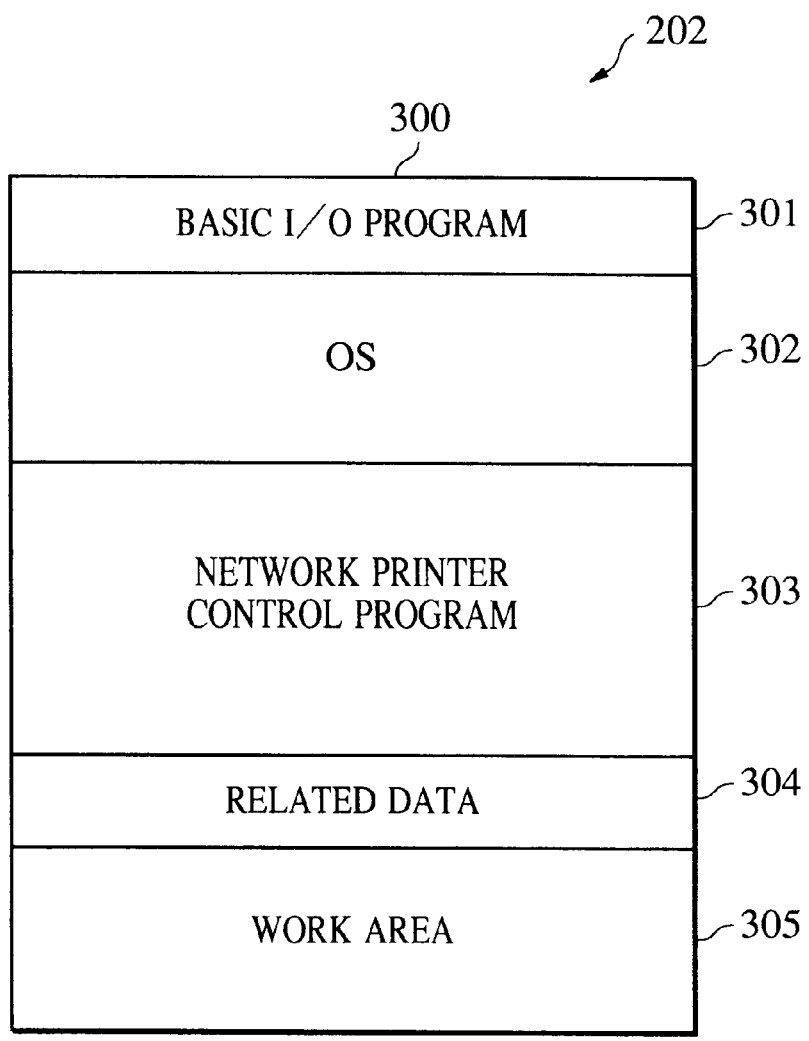
FIG. 5 shows a memory map in a state in which a network printer control program is loaded into a RAM 202 and becomes ready to be executed.

FIG. 5 shows a memory map in a state in which a network printer control program is loaded into the RAM 202 and becomes ready to be executed. In this embodiment, the command is shown which directly loads a network print control program and related data from the FD 204 into the RAM 202 and which executes this program. In addition to this, the network print control program may be loaded from the HD 205 into the RAM 202 each time the network print control program is operated from the FD 204. In addition to the FD, the recording medium for storing network print control programs may be a magneto-optic disk, a CD-ROM, a CD-R, a DVD, magnetic tape, a non-volatile memory card, an IC memory card, and so on. Furthermore, the construction may be formed in such a way that the network print control program is recorded in the ROM 201 in advance, this forming a part of the memory map, and the network print control program is executed directly by the CPU 200.

Referring to FIG. 5, reference numeral 300 denotes a memory map of the RAM 202. Reference numeral 301 denotes a basic I/O program, which includes a program having the IPL (initial program loading) function by which the OS is read from the HD 205 to the RAM 202, causing the operation of the OS to be started when the power of the computer is switched on. Reference numeral 302 denotes an OS. Reference numeral 303 denotes a network print control program. Reference numeral 304 denotes loaded related data. Reference numeral 305 denotes a work area by which the CPU 200 executes the network print control program.

Figure 6:
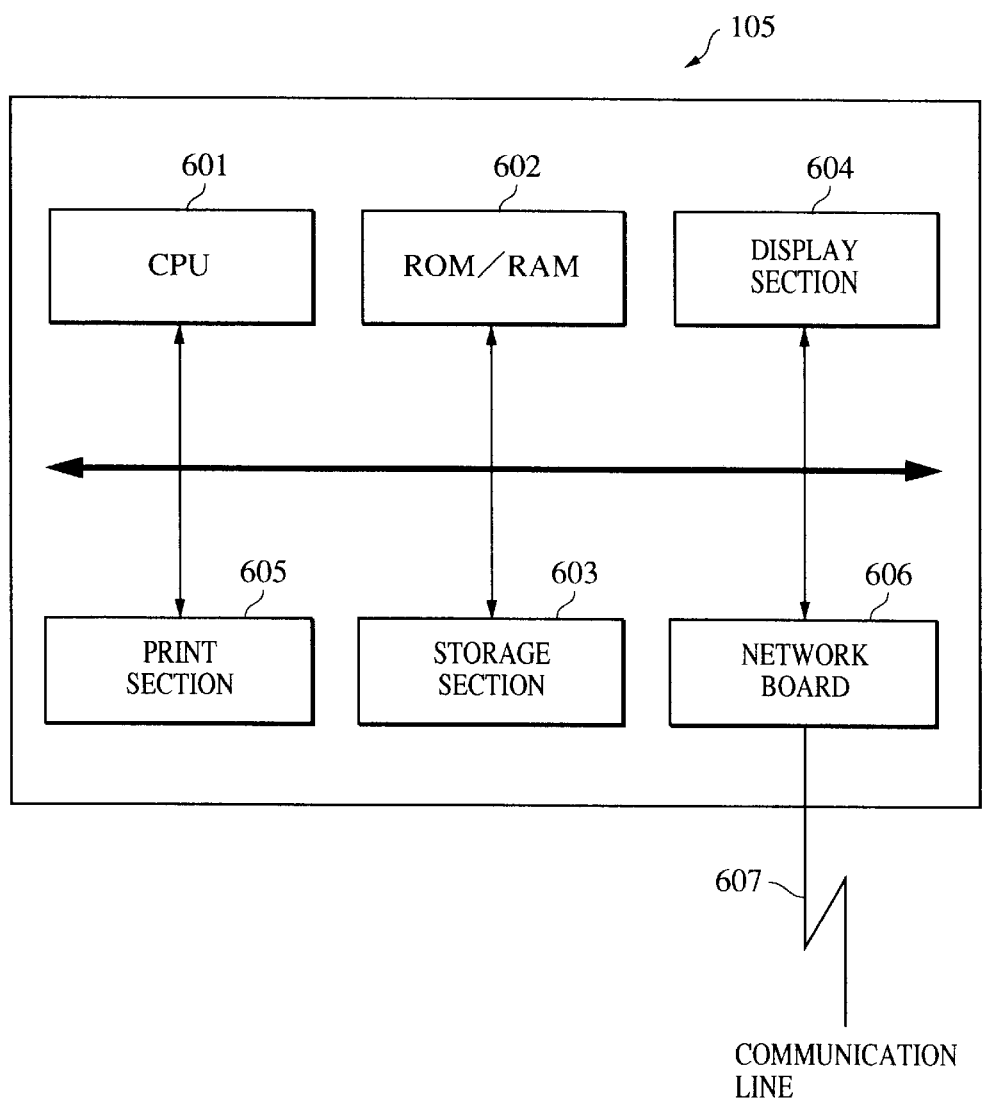
FIG. 6 is a block diagram schematically showing the construction of a network printer 105.

FIG. 6 is a block diagram showing the schematic construction of the network printer 105. Although in this embodiment, a laser beam printer (LBP) is adopted as a network printer, the printer is not limited to this, and it is a matter of course that a printer of another method may be used.

Referring to FIG. 6, reference numeral 601 denotes a CPU which controls the entire apparatus. Reference numeral 602 denotes a memory made of a ROM/RAM, including a buffer for temporarily storing control programs executed by the CPU 601, constant data, and transmission and reception data. Reference numeral 603 denotes a storage section, such as a hard disk, for storing, for example, data to be transmitted and received, and control programs executed by the CPU/601 and data.

Reference numeral 604 denotes a display section, which displays data which is temporarily stored in the ROM/RAM 602, the contents of the data stored in the storage section 603, the operating status, and so on. Reference numeral 605 denotes a print section, which prints and outputs bit-map data produced by the CPU 601 according to a program stored in the ROM/RAM 602. Reference numeral 606 denotes a/network board, which performs communications of data information, such as print data or job information, with an external apparatus, such as a client computer or a server. Reference numeral 607 denotes a communication line, which connects the network board 606 to the network.

Figure 7:
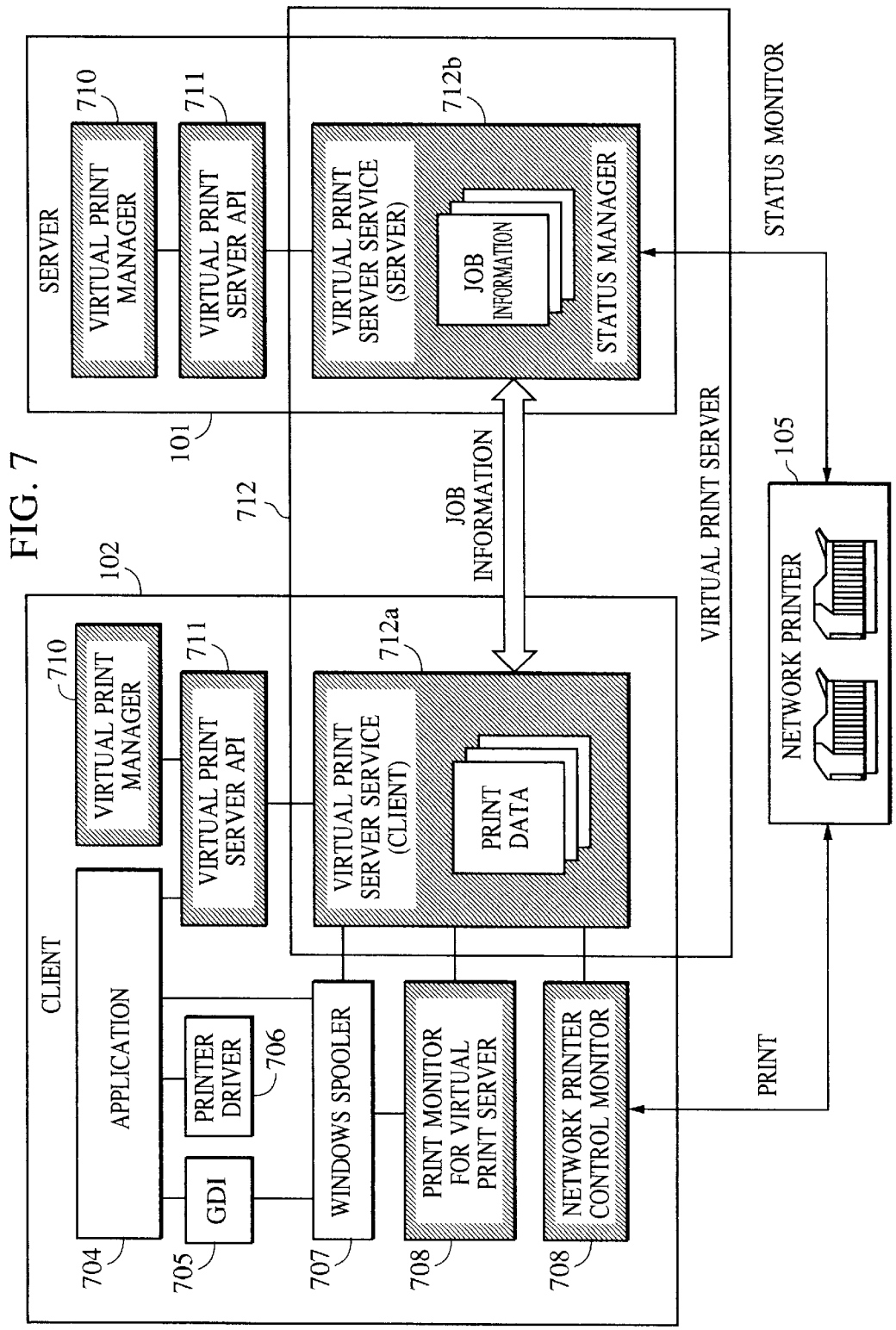
FIG. 7 shows the construction of software modules of a client computer and a server.

FIG. 7 shows the construction of software modules of a client computer and a server. These software modules are supplied from an FD and the like. Shown in FIG. 7 are the construction of the software modules of the above-mentioned network printer 105 and client computer 102, and the construction of the software module of the server 101. The construction of the software modules of the client computers 103 and 104 is the same as that of the client computer 102.

Reference numeral 704 denotes an application module, which outputs a print instruction to the network print system. Reference numeral 705 denotes a GDI (graphical device interface) of the Windows (trademark) operating system. Reference numeral 706 denotes a printer driver installed within the Windows. Reference numeral 707 denotes a printer spooler within the Windows (Windows spooler). Reference numeral 708 denotes a print monitor for a virtual print server. Reference numeral 709 denotes a network printer control monitor. Reference numeral 710 denotes a virtual print manager. Reference numeral 711 denotes a virtual print server API (application interface). Reference numeral 712 denotes a virtual print server service.

These software modules constitute the system of the virtual print server, and in this embodiment, these are supplied from the FD 204. The virtual print manager 710, the virtual print server API 711, and the virtual print server service 712 exist in both the client computer and the server. Hereinafter, the combination of a virtual print server service (client) 712a and a virtual print server service (server) 712b which constitute the virtual print server service 712 is called the virtual print server, and this system is called the virtual print server system.

Figure 8:
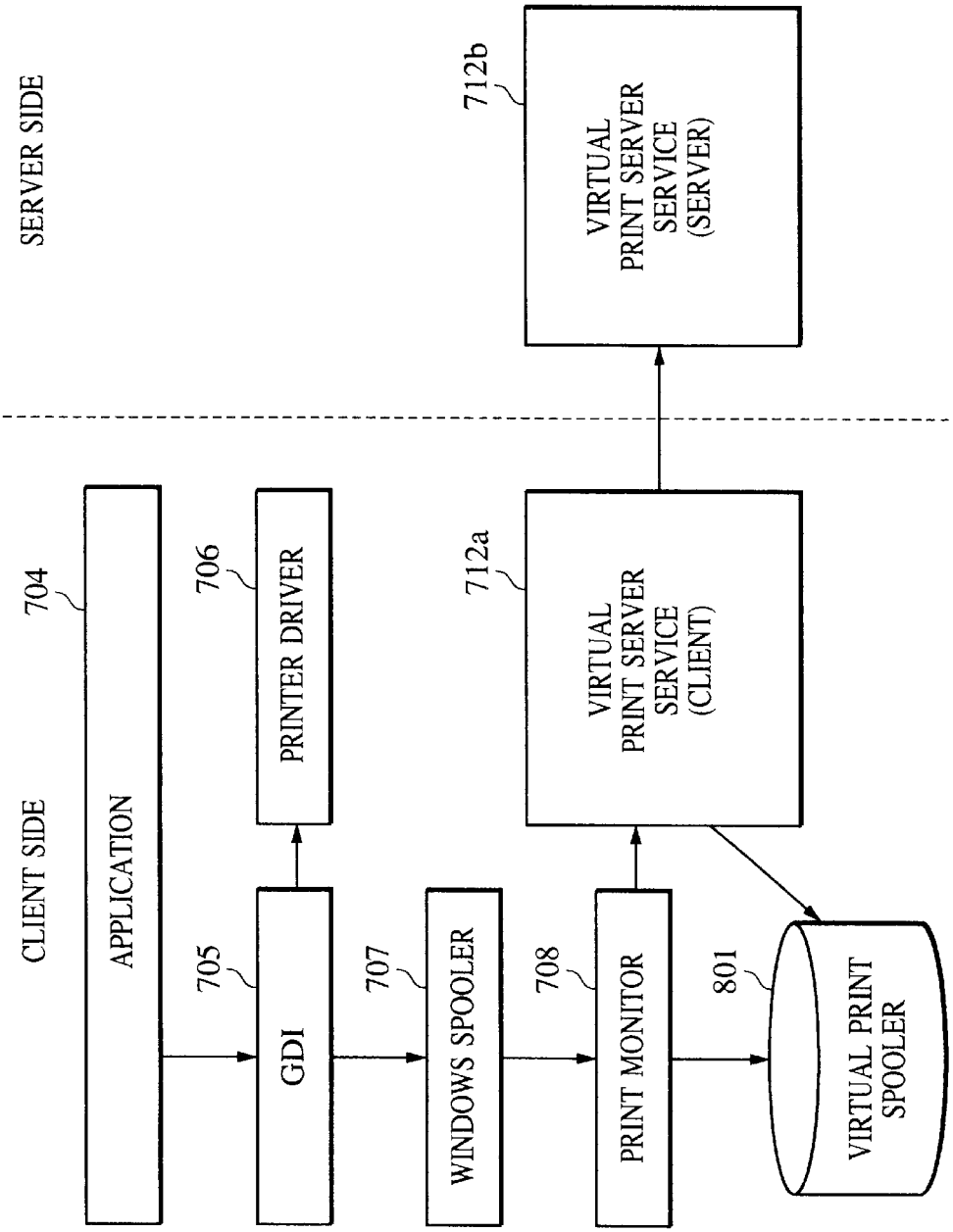
FIG. 8 shows the flow of a printing process in which a printing request is made to a server from a client PC.
Figure 9:
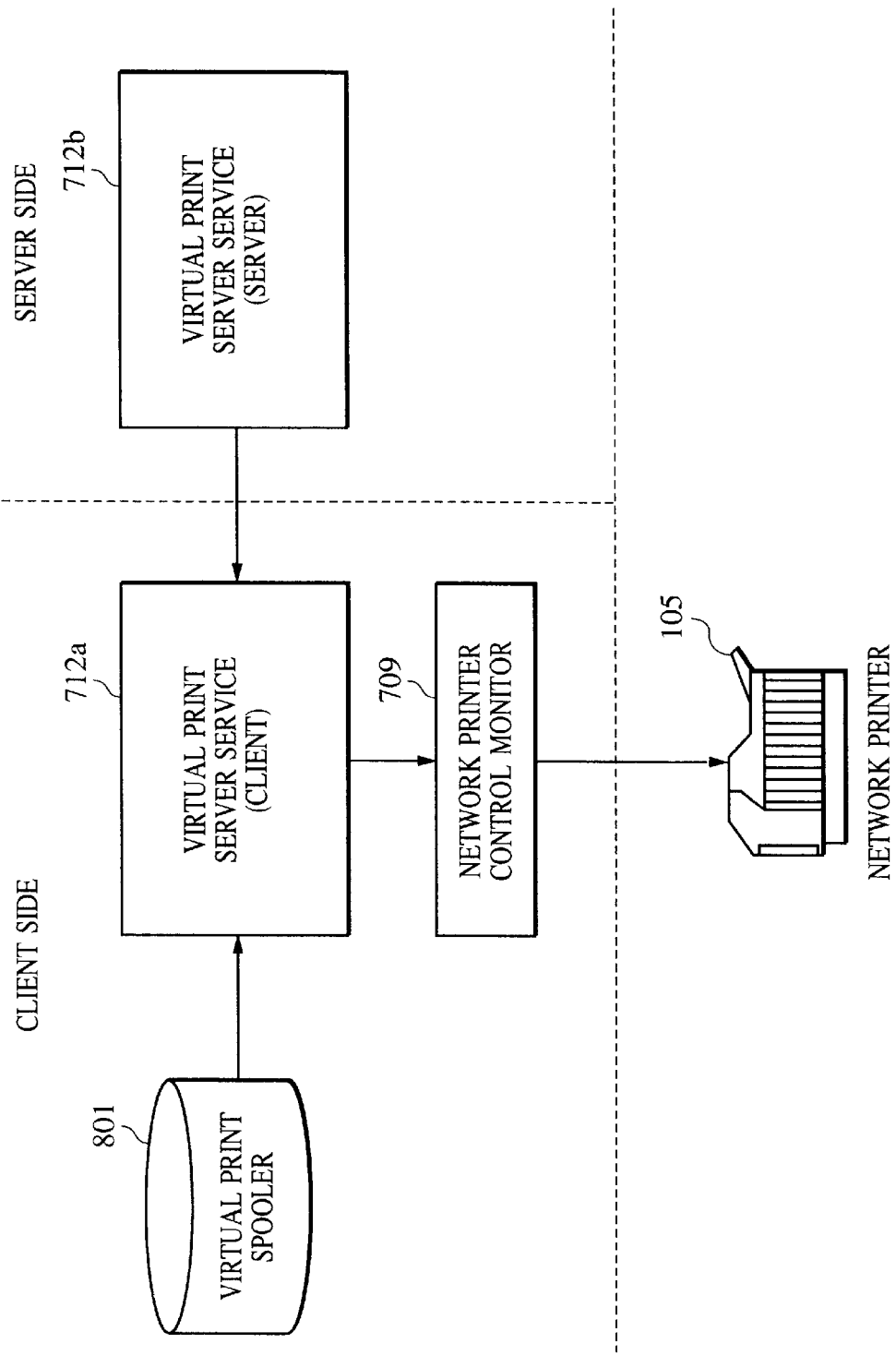
FIG. 9 shows the flow of a printing process in which printing enable permission is given from the server to the client PC so that print data is transmitted to a printer.

Next, a description will be given of the operation for making the client computer PC 102 cause the network printer 105 to perform printing. This embodiment is described using the Windows operating system as an example. FIG. 8 shows the flow of a printing process in which a printing request is made to a server from a client PC. FIG. 9 shows the flow of a printing process in which printing enable permission is given from the server to the client PC so that print data is transmitted to a printer.

The application 704 on the client computer PC 102 starts printing through the GDI 705. The GDI 705 notifies the Windows spooler 707 and the print monitor 708 for the virtual print server of the start of printing. The print monitor 708 for the virtual print server receiving the start of printing requests the virtual print server service (server) 712b on the server 101 to start storing print data through the virtual print server service (client) 712a.

The GDI 705 requests the printer driver 706 to convert the print data into a printer language. The print data which has been converted into the printer language is spooled by the Windows spooler 707. In contrast, the print monitor 708 for the virtual print server receives the print data spooled by the Windows spooler 707 from the Windows spooler 707 and passes the print data to the virtual print server service (client) 712a. The virtual print server service (client) 712a temporarily stores the received print data in a temporary file (not shown) in a virtual print spooler 801 within the HD 205.

When all the print data has been stored in the temporary file within the virtual print spooler 801 inside the HD 205, the virtual print server service (client) 712a notifies the virtual print server service (server) 712b in the server 101 of the termination of the storage of the print data and requests printing. Here, in the virtual print server service 712, the same module is used for the client PC and the server, and can be used differently for the client and the server by setting. That is, the module need not be an apparatus dedicated to the print server, and may be used as a virtual print server service (server) for the server in the client computer. It may be determined in advance which computer is to be used for the server, and priority for becoming a server may be provided in the sequence of the activated client. Furthermore, the client computer which is used as the server may create print data as a client.

The print job entered previously in the virtual print server service 712 is to be printed through the management of the server, and the operation up to actually transmitting print data to the network printer 105 is shown in FIG. 9.

The virtual print server service (server) 712b issues a print enable instruction (sending enable information) to the client PC when its turn for printing comes up. The virtual print server service (client) 712a receiving that instruction reads the print data which is temporarily stored in the virtual print spooler 801 as described above, and passes the print data to the control monitor 709 for the network printer. The control monitor 709 for the network printer passes the print data to the network printer 105 through a print communication protocol, causing the network printer 105 to perform printing.

Figure 10:
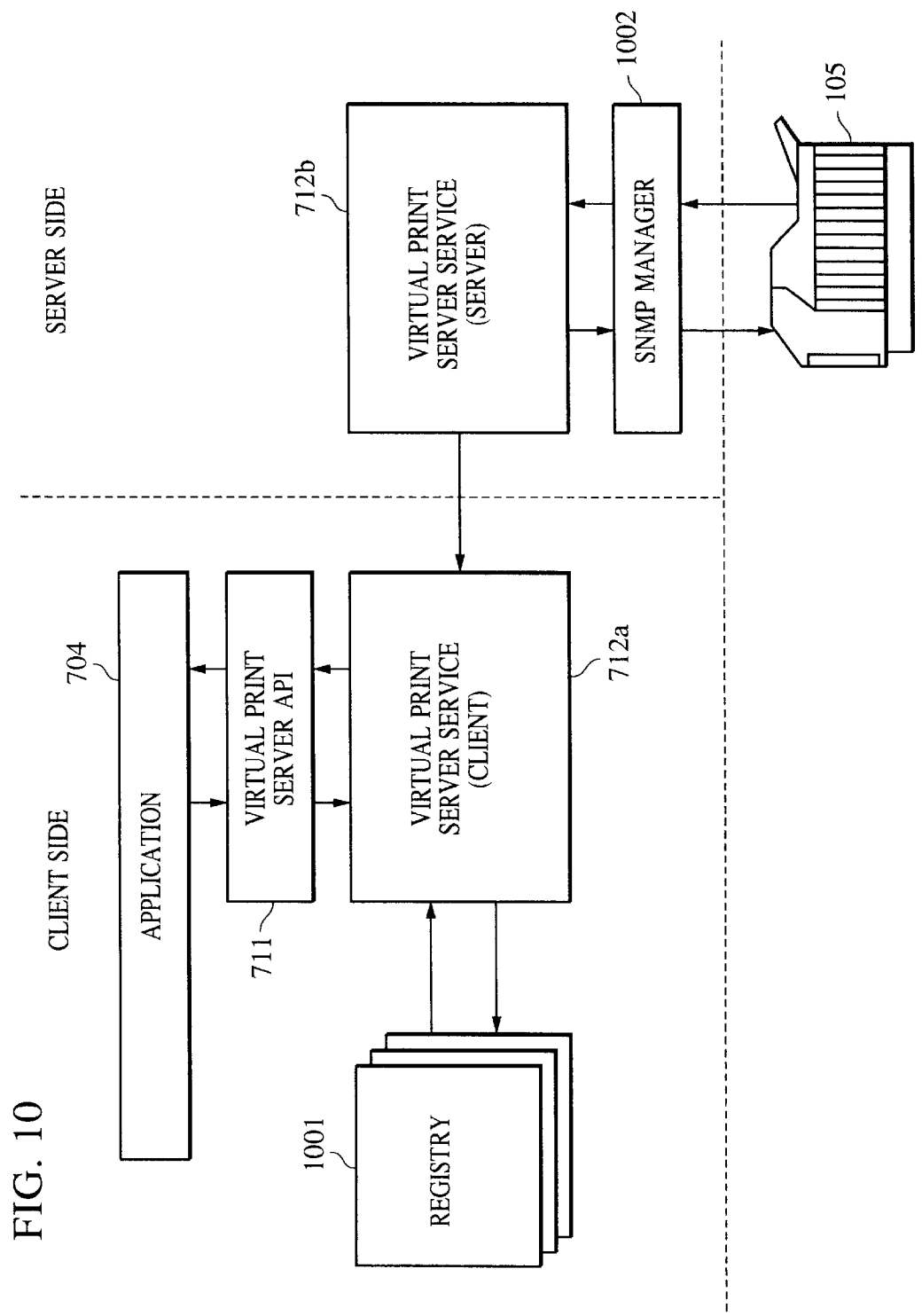
FIG. 10 shows the flow of printer status.

Next, a description is given of the operation for notifying the client PC of the status of the network printer 105. This embodiment is described using Windows as an example. FIG. 10 shows the flow of printer status.

The virtual print server service (server) 712b requests an SNPM (simple network management protocol) manager 1002 to collect status information about the network printer 105 at intervals of five seconds (default). The SNPM manager 1002 makes the status information collection request to the network printer 105. The network printer 105 then returns the current printer status.

When the status of the network printer 105 varies, the virtual print server service (server) 712b provides a status change notification to the client PC which is using this network printer 105. The printer status change notification issued from the server 101 is received by the virtual print server service (client) 712a within the client PC, and the printer status is stored in a registry 1001 allocated in the RAM 202 inside the client PC.

The application 704 can obtain the printer status stored in the registry 1001 through the virtual print server API 711. The virtual print server system performs a printing process in this manner.

In this embodiment, Windows NT is used. The print monitor 708, the virtual print spooler 801, the virtual print server service (client/server) 712, and the network printer control monitor 709 are modules which are new for this embodiment, and the modules other than these are modules of the Windows NT standard. The operating system is not limited to the Windows NT, and a construction is possible even with other operating systems, such as OS/2.

Next, a description is given of a procedure in which in the printing function using the virtual server of the print monitor 708 for the virtual print server, when the virtual print server service (client) 712 accepts a manual-feed-specified print job from the application 704, the printer 105 shifts to an offline state when the printer 105 accepts the job by the addition of a command which instructs a manual-feed specification to the printer 105.

When the virtual print server service (server) 712b receives information that the printer 105 is in the off line state, the virtual print server service (server) 712b notifies the virtual print server service (client) 712a of that status. The virtual print server service (client) 712a receiving the notification displays a dialogue for informing the user of the timing of the manual feed and notifies the application 704 of the event notification of the manual-feed timing.

Figure 11:
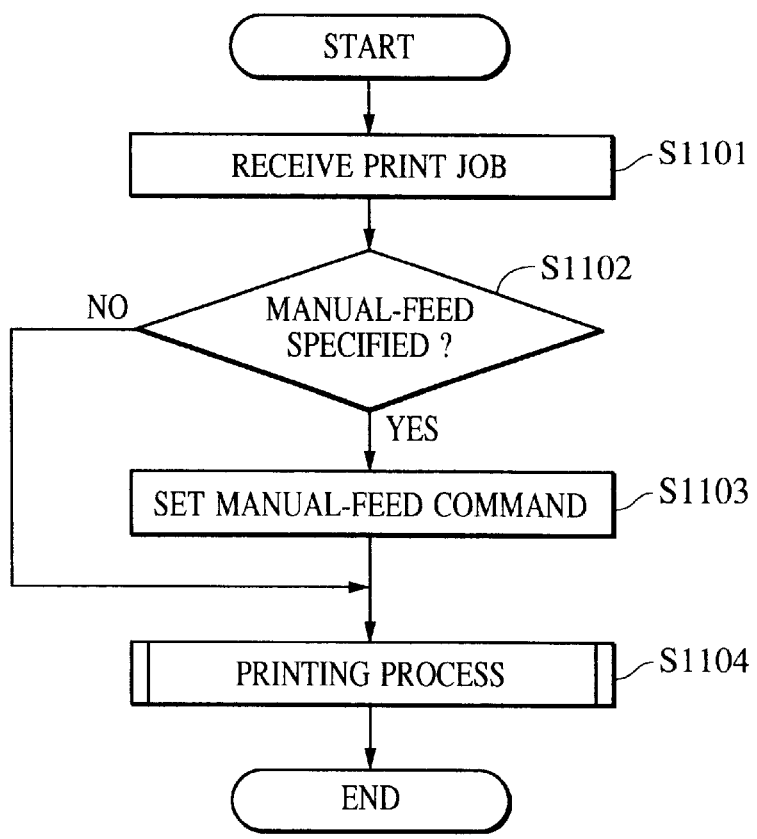
FIG. 11 is a flowchart showing the procedure for adding to a print job a command instructing a manual-feed specification to the printer when the manual-feed-specified job is accepted in a client program of the virtual server system.

FIG. 11 is a flowchart showing the procedure for adding a command, indicating a manual-feed specification to the printer, to a print job when the manual-feed-specified print job is accepted in a client program of the virtual server system.

Initially, in step S1101, in the client program of the virtual server system, a print job is accepted from the print system of the OS. In step S1102, it is determined whether or not a manual-feed print has been instructed from the job information of the OS. When the manual-feed print has been instructed, in step S1103, a command for a manual-feed print is added to the header part of the print data of the print job.

Figure 12:
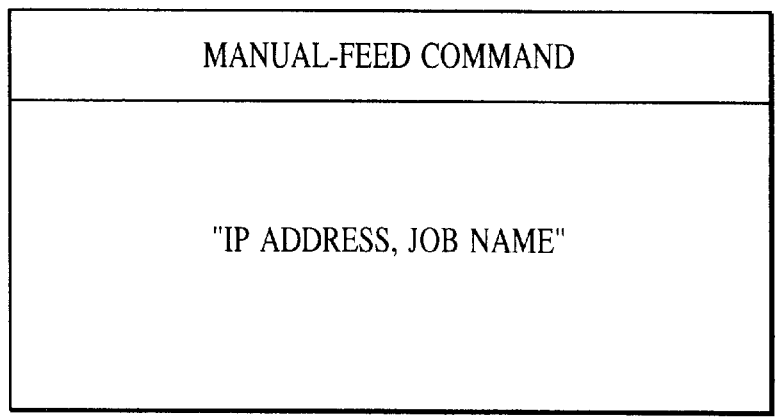
FIG. 12 shows the contents of the command of the manual-feed-specified print.
Figure 13:
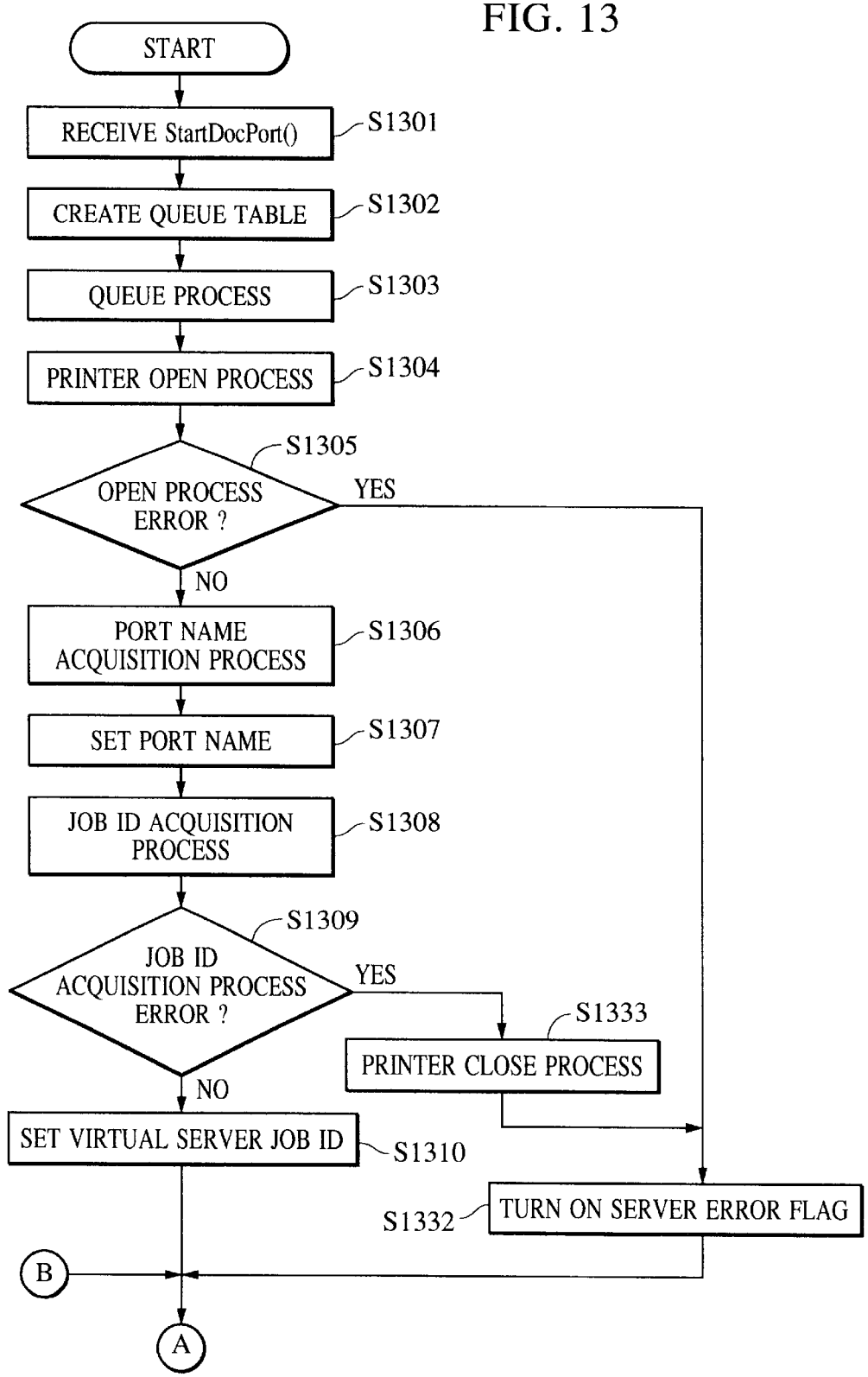
FIG. 13 is a flowchart showing a printing sequence in a printing function in which a virtual server of a print monitor 708 is used.
Figure 14:
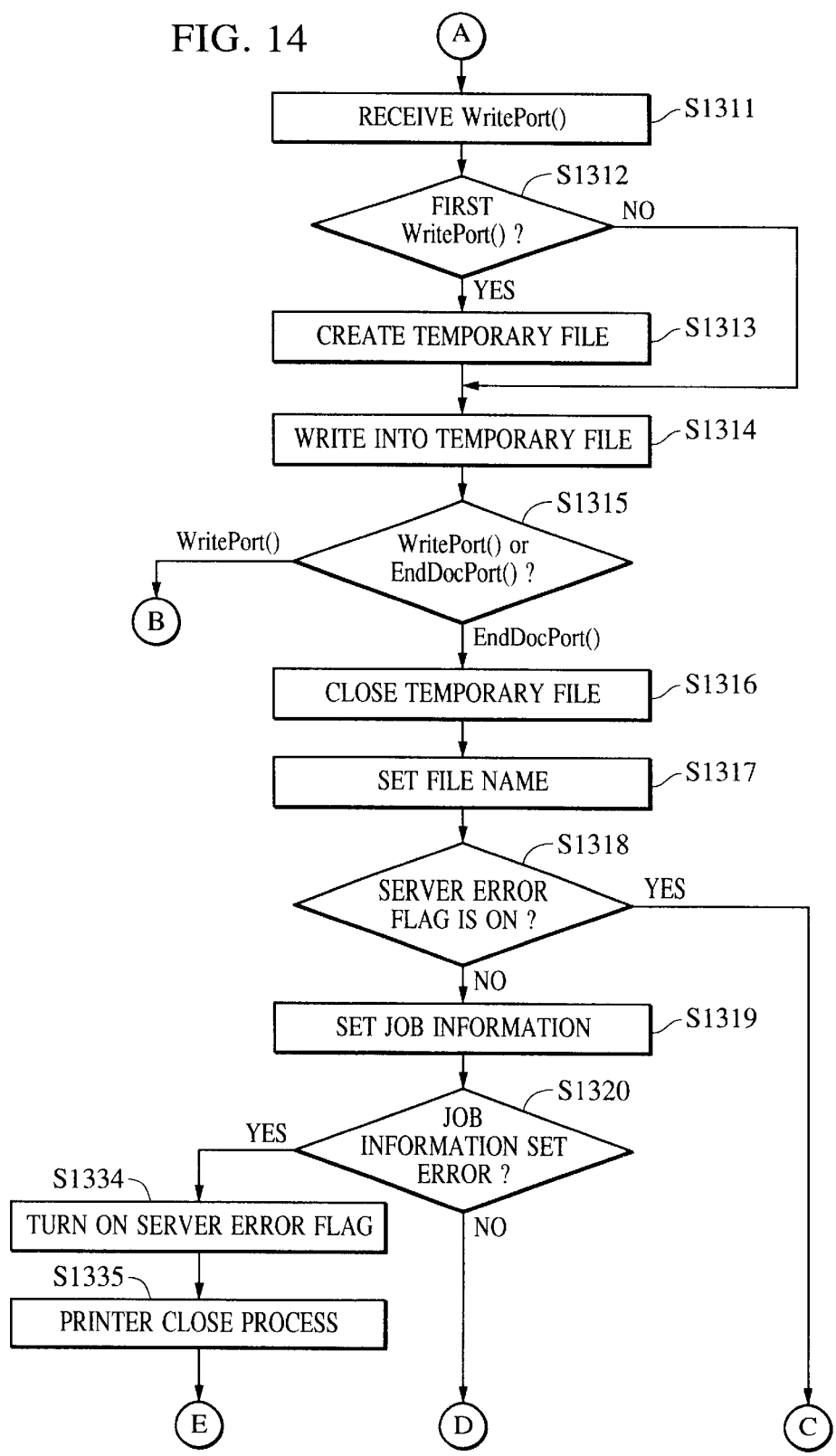
FIG. 14 is a flowchart, following FIG. 13, showing a printing sequence in the printing function in which the virtual server of the print monitor 708 is used.
Figure 15:
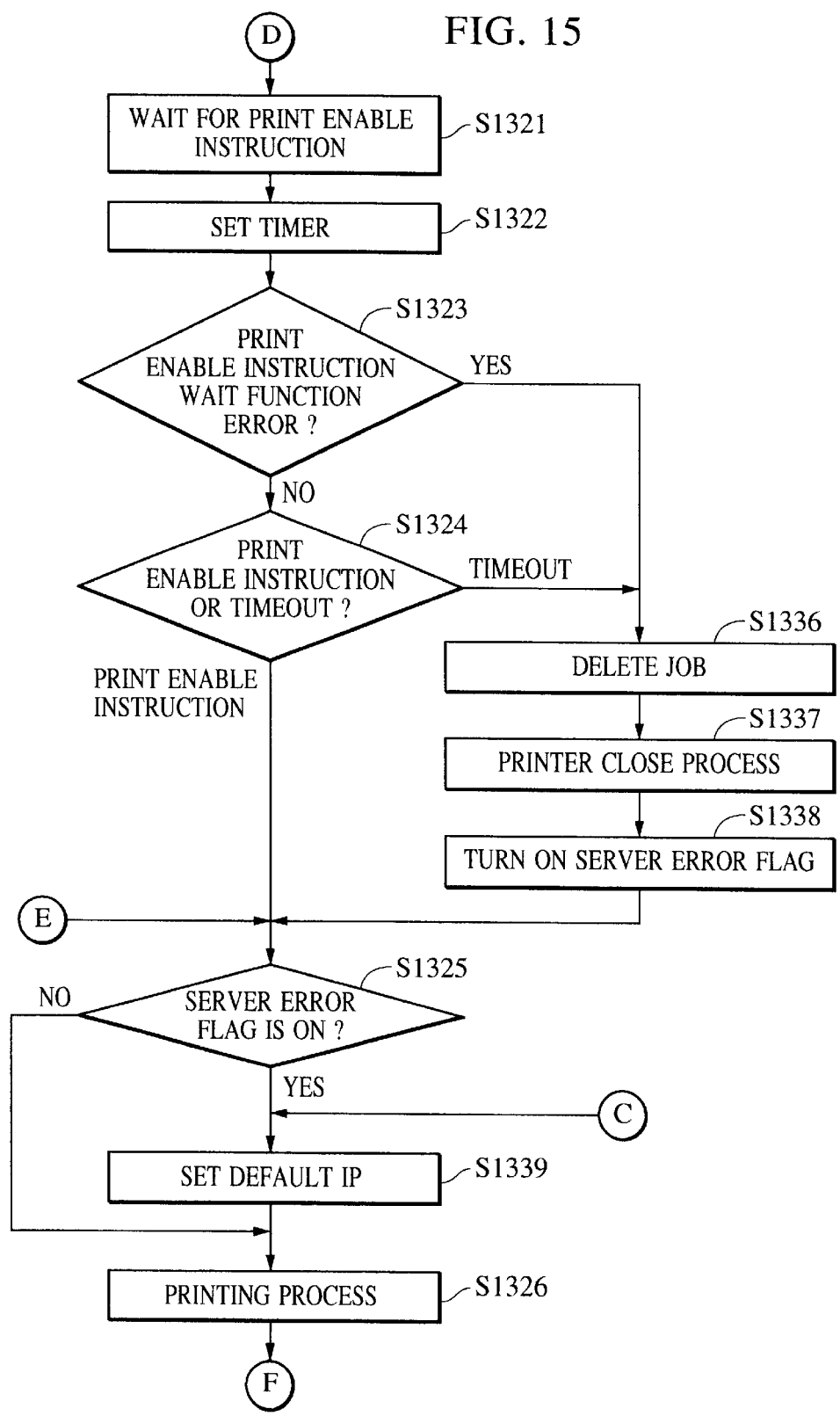
FIG. 15 is a flowchart, following FIGS. 13 and 14, showing a printing sequence in the printing function in which the virtual server of the print monitor 708 is used.
Figure 16:
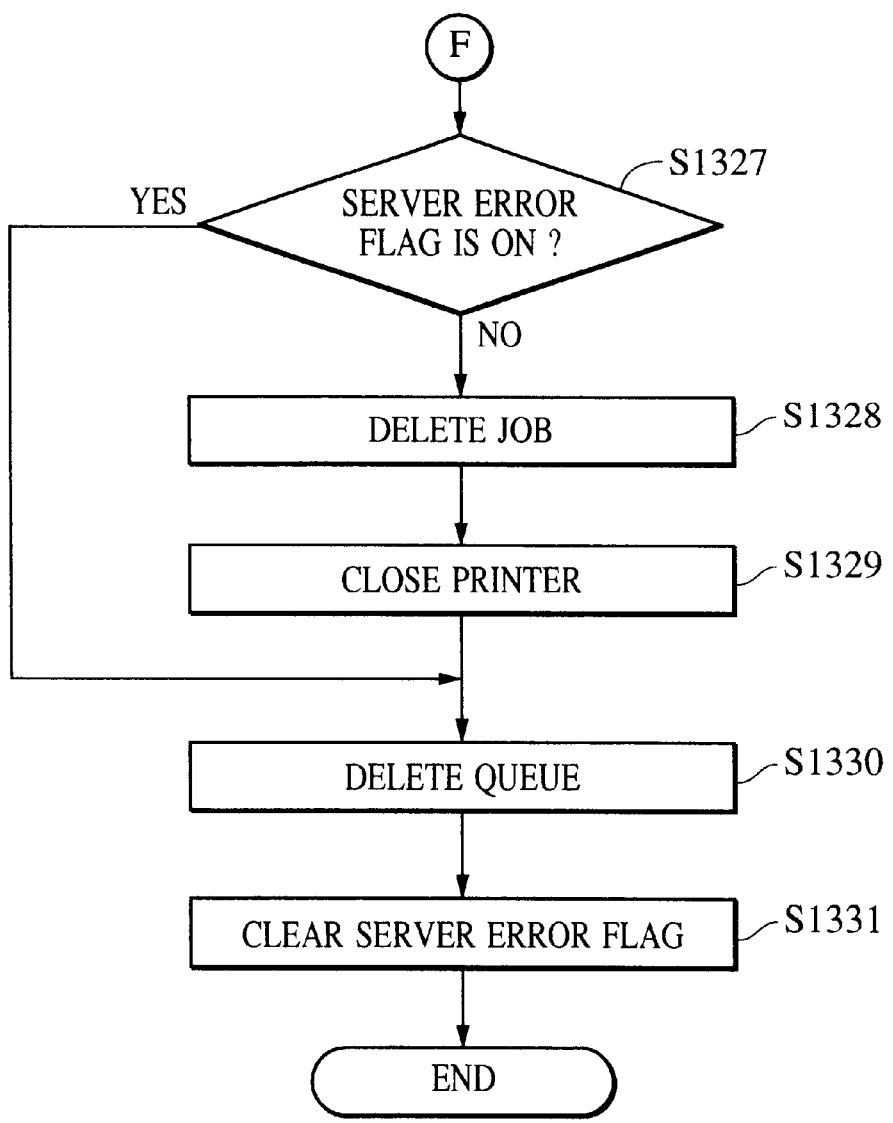
FIG. 16 is a flowchart, following FIGS. 13, 14, and 15, showing a printing sequence in the printing function in which the virtual server of the print monitor 708 is used.

FIG. 12 shows the contents of the command of the manual-feed-specified print. The contents of a message to be displayed on a panel of the printer when the printer is going to print the job of the manual-feed-specified print are added to this command as parameters, and the IP address of the client and the job name are described in this message.

In step S1104, the print job is transferred to the printer according to the printing sequence of the virtual server system, and the processing is terminated. The details of processing of the print job in step S1104 will be described later. In contrast, when the manual-feed-specified print is not instructed from the job information of the OS in step S1102, the process proceeds to step S1104 where the print job is transferred to the printer according to the printing sequence of the virtual server system.

Figure 17:
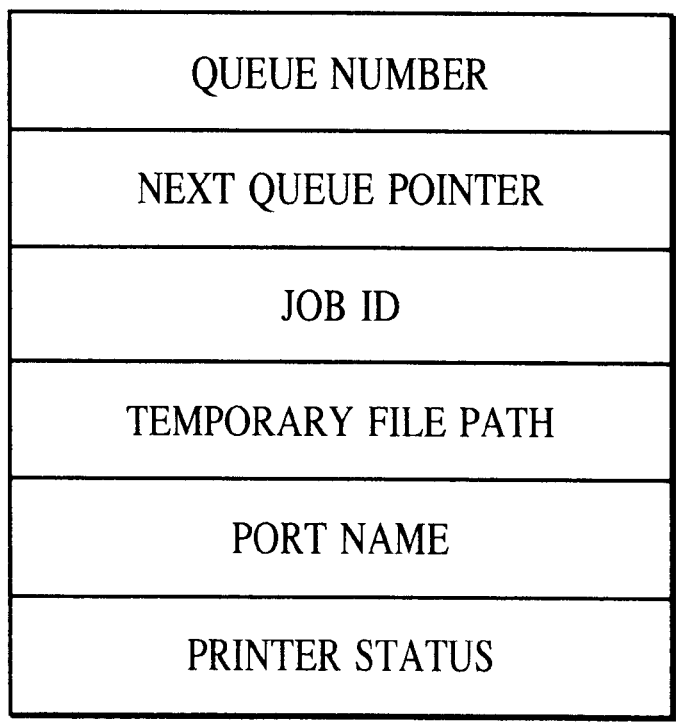
FIG. 17 shows an entry job information queue table.

FIGS. 13, 14, 15, and 16 are flowcharts showing a printing sequence in the printing function in which the virtual server of the print monitor 708 is used. Initially, in step S1301, API (application interface) StartDocPort( ), which is a print start request, is received from the Windows spooler 707. In step S1302, an entry job information queue table is created, and the job ID given by StartDocPort( ) in step S1301 is set. FIG. 17 shows an entry job information queue table.

Then, in step S1303, the job ID is linked to the queue table. In step S1304, the print monitor 708 calls , VPSOpenPrinter( ), which is an API of the virtual print server, in order to open the printer managed by the virtual print server. In step S1305, it is determined whether or not VPSOpenPrinter( ) is in error.

In step S1306, when VPSOpenPrinter( ) is correct, VPSGetPrinter( ), which is an API of the virtual print server, is called to obtain the actual port name of the network printer 105. In step S1307, the port name is set in a corresponding entry job information queue table (see FIG. 17).

In step S1308, VPSGetJobId( ), which is an API of the virtual print server, for obtaining the print job ID managed by the virtual print server, is called. In step S1309, it is determined whether or not the VPSGetJobId( ) function is in error. When the VPSGetJobId( ) function is correct, the process proceeds to step S1310 where the obtained job ID of the virtual server is set in a corresponding entry job information queue table.

In step S1311, APIWritePort( ) for writing print data from the Windows spooler 707 is received. In step S1312, a determination is made as to whether or not it is the first WritePort( ). In step S1313, when it is the first WritePort( ), a temporary file is created.

In step S1314, the print data is written into the temporary file. In step S1315, it is determined whether the function required from the Windows spooler 707 is WritePort( ) or EndDocPort( ). When the function is WritePort( ), the process proceeds to step S1311, and when the function is EndDocPort( ), the process proceeds to step S1316.

In step S1316, a process for closing the temporary file is performed, and in step S1317, the path name of the temporary file is set in the corresponding entry job information queue (see FIG. 17).

Figure 18:
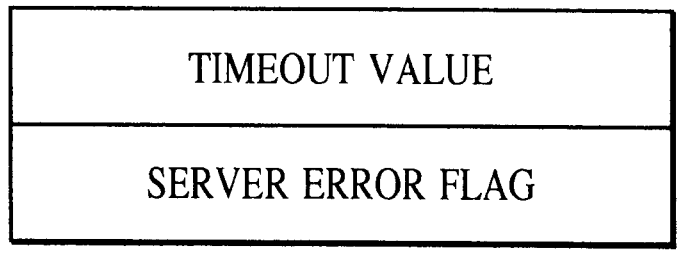
FIG. 18 shows the contents of a server error flag.

Then, in step S1318, it is determined whether or not the server error flag is ON. FIG. 18 shows the contents of the server error flag. When the server error flag is OFF, in step S1319, VPSSetJob( ), which is an API of the virtual print server API, is called to enter the job information managed by the print monitor 708 in the virtual print server. In step S1320, it is determined whether or not the VPSSetJob( ) function is in error. In the case of a normal termination, in step S1321, VPSWaitJob( ), which is an API of the virtual print server, is called to make a request such that when a print enable is issued, the printing of the specified print job becomes possible, and the printer waits for the print enable instruction. A timer function for providing a timeout notification when the specified time is reached is called to obtain, from a timeout value (see FIG. 18), a time at which a printing process is performed without waiting for a printing instruction from the server when a predetermined time is elapsed, and the timer is set in step S1322.

In step S1323, it is determined whether or not the VPSWaitJob( ) function is correct. When it is correct, the process proceeds to step S1324 where the printer waits for the arrival of the print enable instruction or a timeout. When the print enable instruction is received, the process proceeds to step S1325.

In step S1325, it is determined whether or not the server error flag (see FIG. 18) is ON. When the server error flag is OFF, a corresponding queue table is obtained from the entry job information queue corresponding to the job ID specified in the print enable instruction, the network IP is obtained from the port name, and a printing process is performed by the network printer 105 in step S1326.

When the printing process is terminated, in step S1327, it is determined whether or not the server error flag is ON. When the server error flag is OFF, with respect to the virtual print server, VPSSetJob( ) is called to instruct a request for canceling the corresponding job, and that the job has been terminated is notified in step S1328. Specifically, the corresponding job information stored in the server and the print data within the client are deleted.

In step S1329, VPSPrinterClose( ) is called to close the printer opened in step S1304.

In step S1330, the corresponding entry job information queue table (see FIG. 17) is deleted, the server error flag is cleared in step S1331, and the processing is terminated. When, in contrast, VPSOpenPrinter( ) is in error in step S1305, the server error flag is turned on in step S1332, and the process proceeds to step S1311.

When, in contrast, the VPSGetJobId( ) function is in error in step S1309, the process proceeds to step S1333 where VPSPrinterClose( ) is called to close the printer, opened in step S1304.

In step S1332, the server error flag is turned on, and the process proceeds to step S1311.

When, in contrast, the server error flag is ON in step S1318, the IP address of the default printer is set in the port name of the corresponding queue table of the entry job information queue in step S1339. Then, the process proceeds to step S1326.

When, in contrast, the VPSSetJob( ) function is in error in step S1320, the server error flag is turned on in step S1334, and the process proceeds to step S1335. In the processing of step S1335, VPSPrinterClose( ) is called to close the printer opened in step S1304, and thereafter, the process proceeds to step S1325.

When, in contrast, it is determined in step S1323 that the VPSWaitJob( ) function is abnormal, the process proceeds to step S1336. In the processing of step S1336, with respect to the virtual print server, VPSSetJob( ) is called to instruct a request for deleting the corresponding job and the fact that the job has been terminated is notified. Then, in step S1337, VPSPrinterClose( ) is called to close the printer opened in step S1304. In step S1338, the server error flag is turned on, and the process proceeds to step S1325.

When, in contrast, the server error flag is ON in step S1325, the IP address of the default printer is set in the port name of the corresponding queue table of the entry job information queue in step S1339. Then, the process proceeds to step S1326.

When, in contrast, the server error flag is ON in step S1327, the process proceeds to step S1330.

Figure 19:
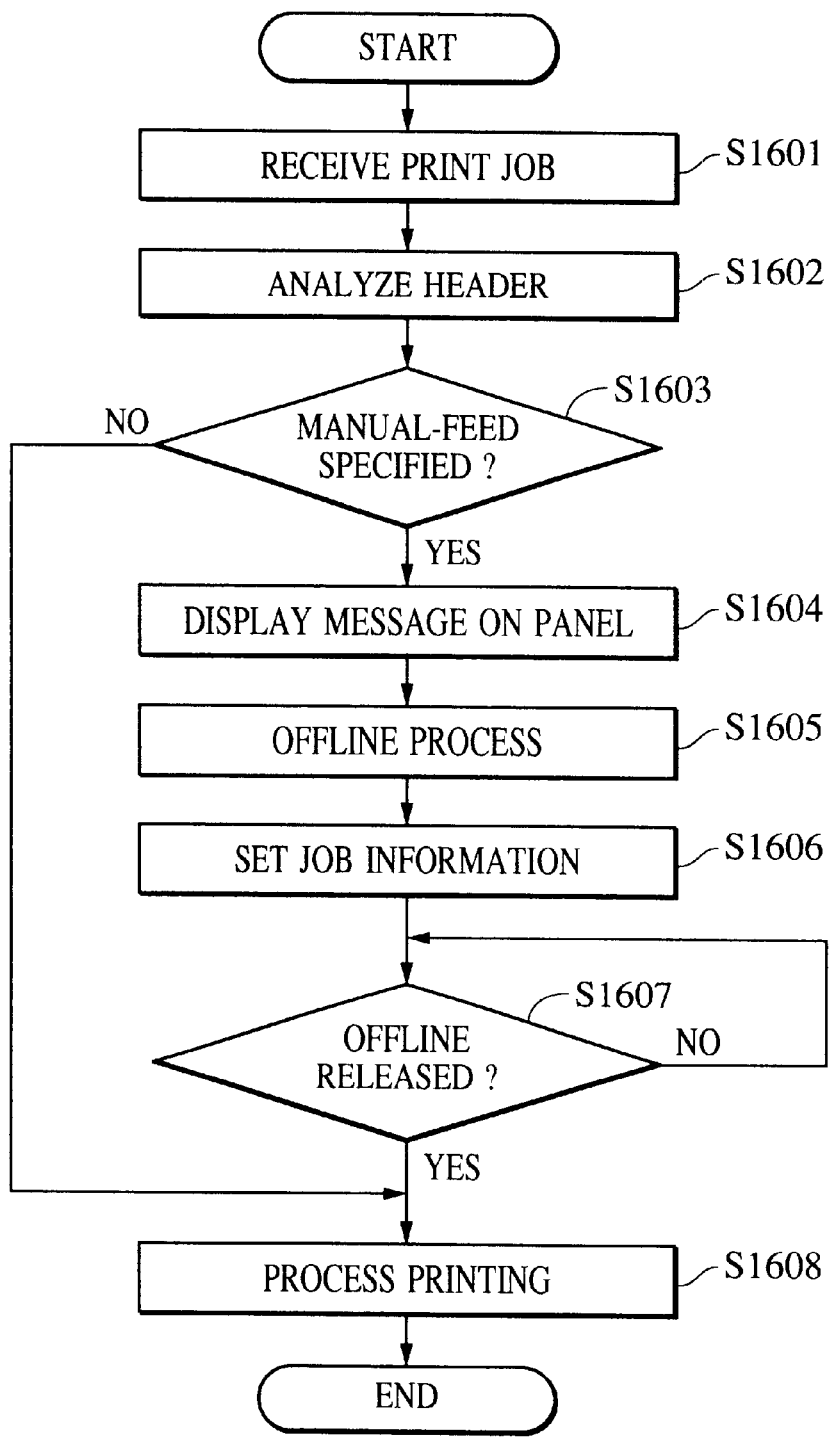
FIG. 19 is a flowchart showing the procedure when a job to which a manual-feed command is added is accepted by the printer.

FIG. 19 is a flowchart showing the procedure when a job to which a manual-feed command is added is received by the printer. When the printer receives a job in step S1601, the header part of the print data of the job is analyzed in step S1602. In step S1603, it is determined whether or not a manual-feed command is specified. When the manual-feed command is specified, the message specified in the manual-feed command is displayed on the panel of the printer in step S1604.

Figure 20:
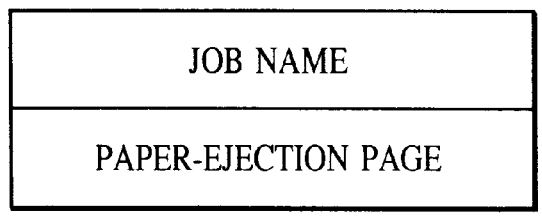
FIG. 20 shows a job information table inside the printer.

The IP address of the client and the job name are described in this message. In step S1605, the printer is placed in an offline state so as to provide a timing at which the user sets manual-feed paper. In step S1606, the job name and the number of ejected pages are set in the job information table inside the printer. In this case, since the printer is made to go offline before paper ejection, the number of pages is set to zero. FIG. 20 shows a job information table inside the printer. It is possible for the server program of the virtual server system to refer to this table by using SNPM (simple network management protocol).

In step S1607, it is determined whether or not the user has set manual-feed paper in the manual-feed timing and whether or not the offline state of the printer is released. When the offline state is released, printing is performed in step S1608.

When, in contrast, the manual-feed command has not been specified in step S1603, printing is started in step S1608. When, in contrast, the offline state of the printer is not released in step S1607, the printer waits until the offline state is released.

Figure 21:
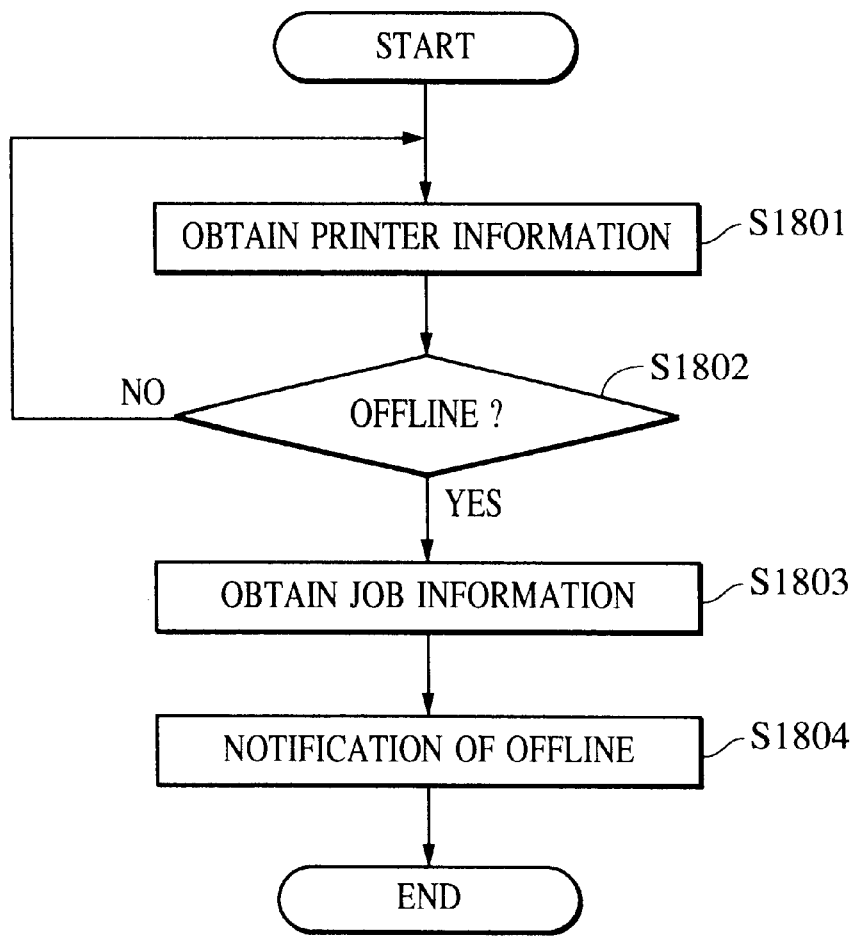
FIG. 21 is a flowchart showing the protocol of processing in which the job information table of the printer is referenced by SNMP in a server program of the virtual server system, and when a job of a manual-feed-specified print is detected, the job is notified to the client.

FIG. 21 is a flowchart showing the protocol of processing in which the job information table of the printer is referenced by SNMP in the server program of the virtual server system, and when a job of a manual-feed-specified print is detected, this fact is notified to the client.

Initially, in step S1801, the status of the printer is obtained by the SNMP. In step S1802, it is determined whether or not the status of the printer is offline. When the status of the printer is offline, in step S1803, the contents of the job information table of the printer and the contents of the panel message of the printer are obtained by the SNMP. In step S1804, an offline Notify command in which the job name and the number of pages are parameters is notified to the client of the IP address specified in the parameter of the panel message, and the processing is terminated.

Figure 22:
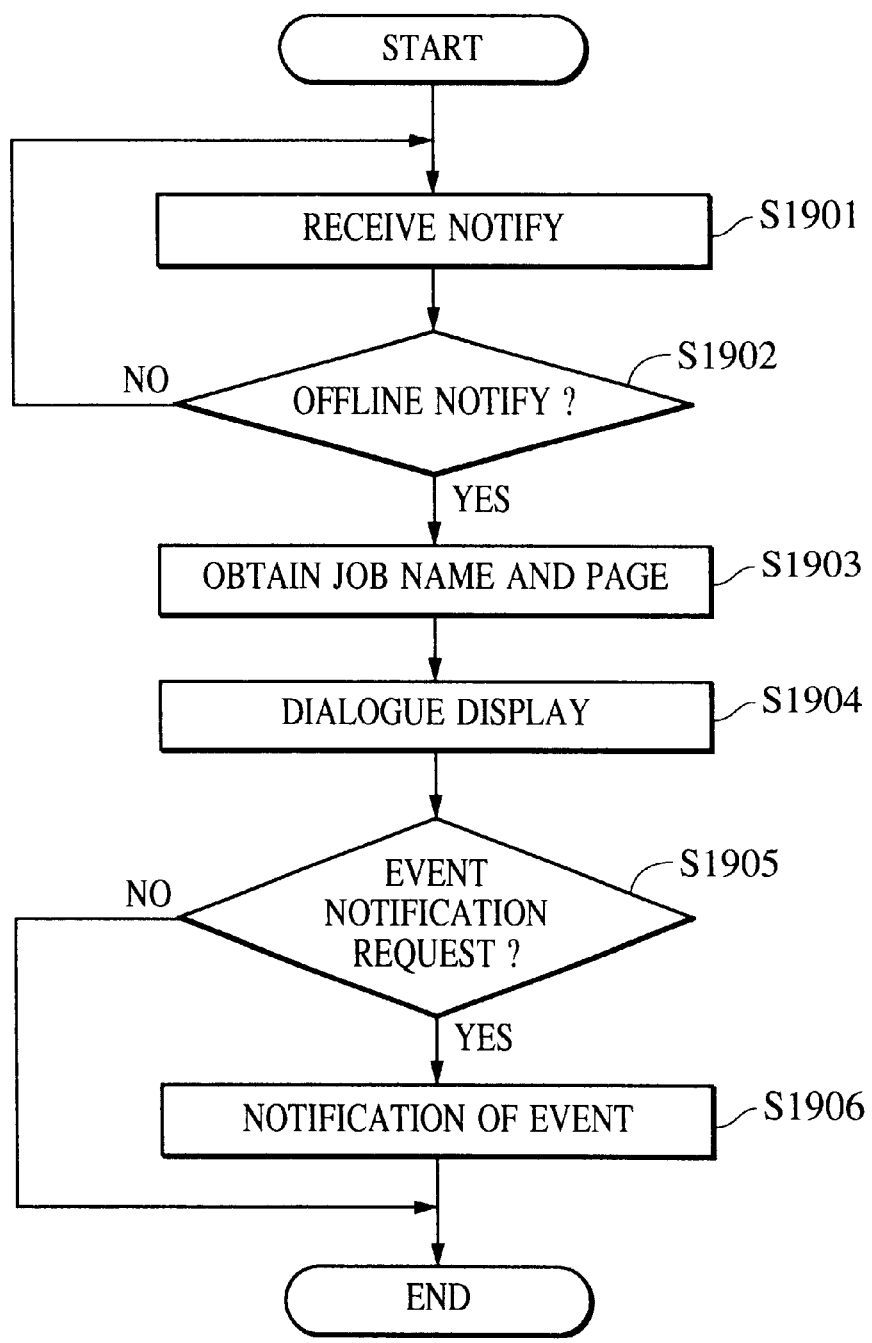
FIG. 22 is a flowchart showing a procedure in which when notification of an offline Notify command from the server program is received in the client system program of the virtual server, a dialogue for notifying a corresponding user of the manual-feed timing is displayed, and an event notification of the manual-feed timing is provided to the word processor application.

FIG. 22 is a flowchart showing a procedure in which when notification of an offline Notify command from the server program is received in the client system program of the virtual server, a dialogue for notifying a corresponding user of the manual-feed timing is displayed, and an event notification of the manual-feed timing is provided to the word processor application.

Figure 23:
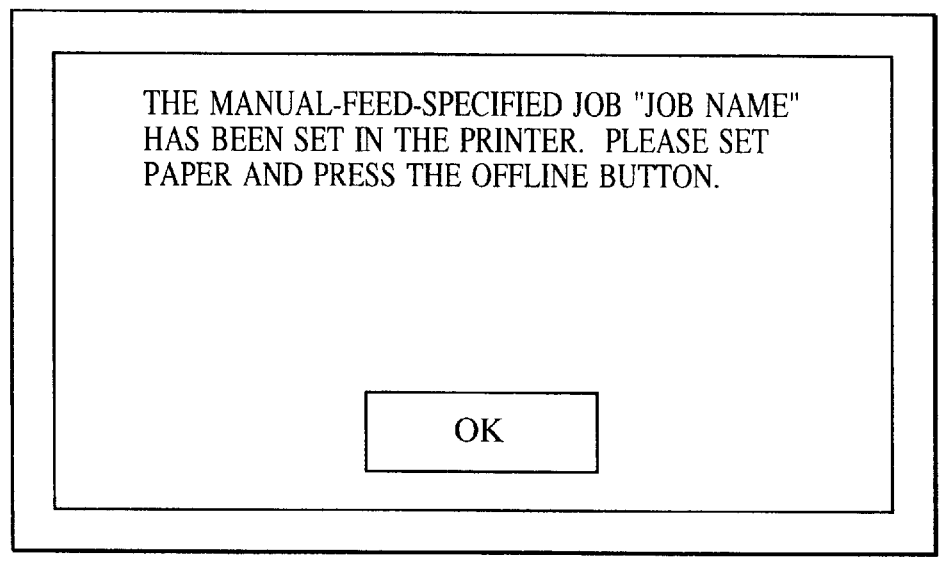
FIG. 23 shows a dialogue display.

Initially, in step S1901, a Notify command from the server is received. In step S1902, it is determined whether or not the Notify command from the server is an offline Notify command. When it is an offline Notify, in step S1903, the job name and the number of pages are obtained from the parameters of the offline Notify command. When the number of pages is zero, the job name is set in the dialogue resource, and the dialogue display is made in step S1904. FIG. 23 shows a dialogue display.

In step S1905, it is determined whether or not an event notification request which notifies the manual-feed timing has been received from the application. When the request has been received, in step S1906, notification of the event is provided to the application, the job name is notified, and the processing is terminated.

In this way, in the network print system of this embodiment, the virtual server system recognizes the manual-feed-specified timing for the user from the job information of the printer, making it possible for the client machine to notify the user of the manual-feed timing via the dialogue. Furthermore, the virtual server system recognizes the manual-feed-specified timing for the user from the job information of the printer, making it possible to notify the event of the manual-feed-specified timing when there is an application waiting for an event notification of the manual-feed-specified print in the client machine.

Second Embodiment

Next, a second embodiment of the present invention is described.

In the second embodiment, the software module construction which is the same as that of FIG. 7 is adopted, and differences from the first embodiment are described below.

In the first embodiment of the present invention, as shown in FIG. 11, a command for instructing the manual-feed specification to the printer when a manual-feed-specified print job is received in the client program is added to the print job, and further, as shown in FIG. 19, the printer receiving the command instructing the manual-feed specification is always placed in an offline state. In the second embodiment, however, when the printer receives a job to which the manual-feed command is added, processing shown in FIG. 24 is performed.

Figure 24:
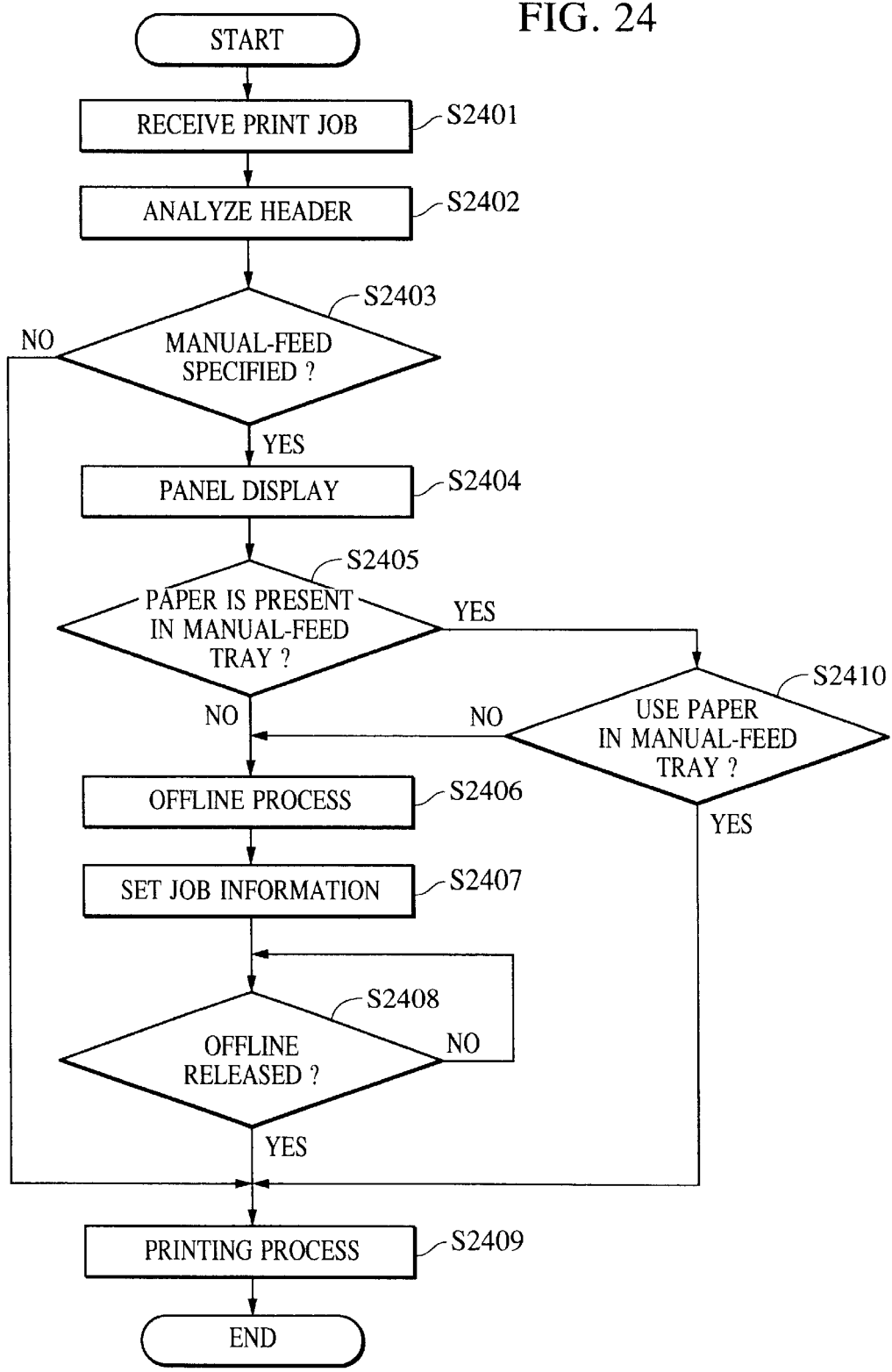
FIG. 24 is a flowchart showing a procedure in which a printer accepts a job to which a manual-feed command is added, which printer is placed in an offline state when there is no in the manual-feed tray and which printer is not placed in an offline state when there is a recording medium in the manual-feed tray and records on the recording medium.

Referring to FIG. 24, when the printer receives the job in step S2401, the header part of the print data of the job is analyzed in step S2402. In step S2403, it is determined whether or not a manual-feed command has been specified in the header part. When the manual-feed command has not been specified, the process proceeds to step S2409 where printing is started.

When, in contrast, the manual-feed command has been specified, the process proceeds to step S2404 where the message specified in the manual-feed command is displayed on the panel of the printer, and the process proceeds to step S2405. The IP address of the client and the job name are described in this message.

In step S2405, it is determined whether or not there is paper in the manual-feed tray of the printer. When there is no paper in the manual-feed tray, the process proceeds to step S2406 where the printer is placed in an offline state so that a timing at which the user sets manual-feed paper is provided. In step S2407, the job name and the number of ejected pages are set in the job information table inside the printer. In this case, since the printer is made to go offline before paper ejection, the number of pages is set to zero. It is possible for the server program of the virtual server system to refer to this job information table by using SNPM.

In step S2408, it is determined whether or not the user has set manual-feed paper in the manual-feed tray and whether or not the offline state of the printer is released. When the offline state is released, the process proceeds to step S2409 where printing is performed. When, in contrast, the offline state of the printer is not released, the printer waits until the offline state is released.

When it is determined in step S2405 that there is paper in the manual-feed tray, the process proceeds to step S2410 where it is determined whether or not the paper in that manual-feed tray is used. When it is determined that the paper in that manual-feed tray is used, printing is performed by feeding paper. When, in contrast, it is determined that the paper in the manual-feed tray is not used, the process proceeds to step S2406 where offline processing is performed.

This determination may be made in such a way that selection of whether or not paper in the manual-feed tray is used by the printer is made in advance, or such that a command for instructing whether or not paper in the manual-feed tray is used when the manual-feed-specified command is added by the client computer and selection is made. Alternatively, notification may be newly provided to the client computer so that selection of whether or not paper in the manual-feed tray is used is made by the user.

The foregoing is a case in which, in the network print system according to the second embodiment, when the printer accepts a manual-feed-specified print job, a selection can be made of whether or not the printer is placed in an offline state when there is paper in the manual-feed tray of the printer, that is, whether or not printing is performed by feeding paper from the manual-feed tray without notifying the manual-feed timing. Addition of such a processing selection method allows the user to choose the method of use.

The second embodiment is a case in which selection can be made beforehand of whether or not printing is performed by automatically feeding paper when there is paper in the manual-feed tray. However, when printing is performed in a printer such that such a selection cannot be made and paper is always automatically fed when there is paper in the manual-feed tray, a manual-feed notification is provided to the client computer only when there is no paper in the manual-feed tray.

Third Embodiment

The first and second embodiments describe manual-feed notification in a case in which a virtual print server is used.

Figure 25:
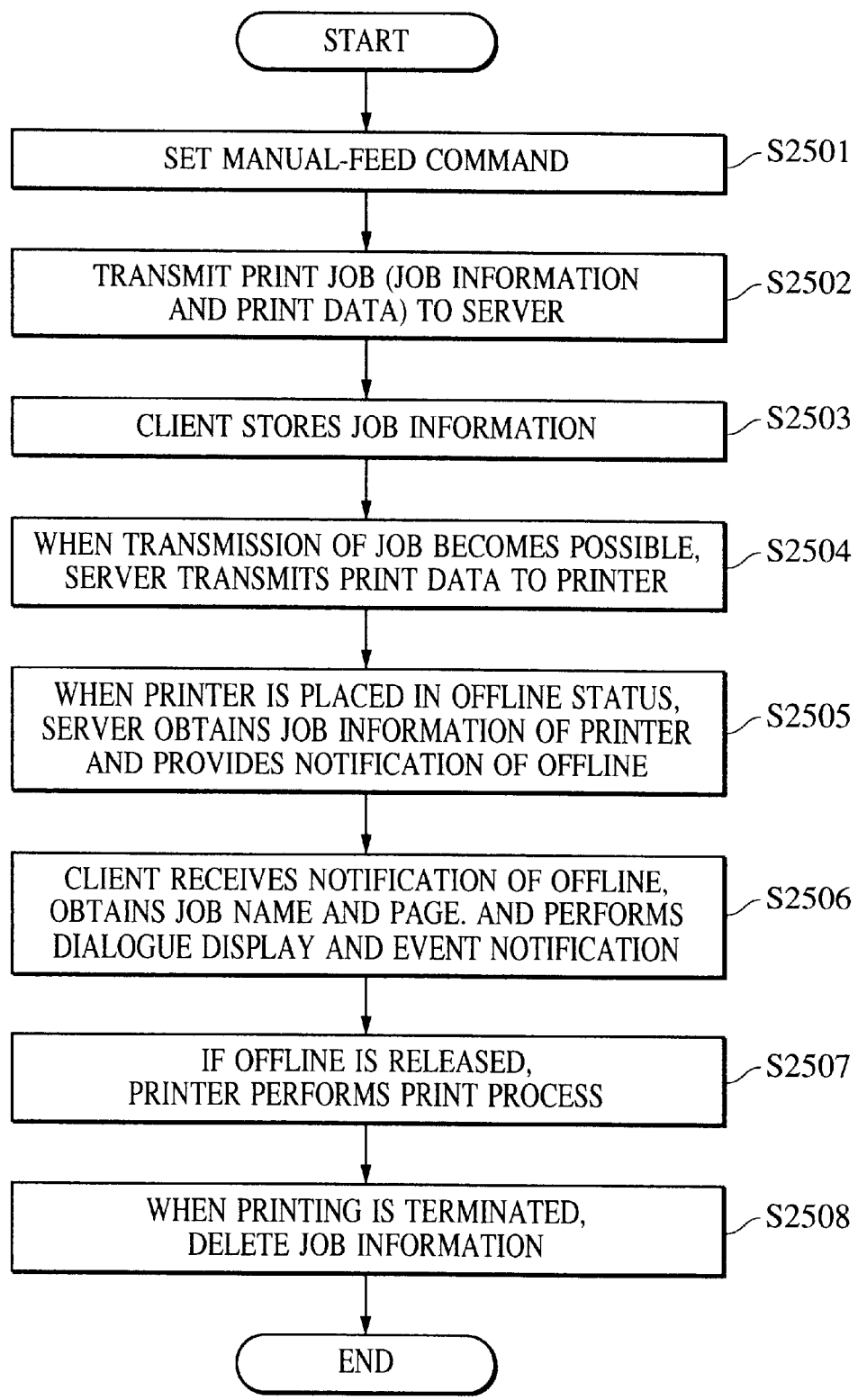
FIG. 25 shows a printing sequence in which a manual-feed notification is provided to a specific client in a case in which the virtual print server system is not used.

Referring to FIG. 25, the third embodiment describes a case in which manual-feed notification is provided in a print system when a virtual print server is not used.

The third embodiment is also a print system comprising a plurality of clients, and a server, and a network printer in a manner similar to that in FIG. 1.

FIG. 25 shows a printing sequence of a print system according to the third embodiment.

In step S2501, if there is a manual-feed specification in a print job accepted from the application, in a client, the command for the manual-feed-specified print is added to the header part of the print data of the print job. Specifically, the manual-feed command is set in a step similar to that in FIG. 11.

In step S2502, the print job (the job information and the print data) is transmitted from the client to the server. The server stores the received job information and print data.

In step S2503, the client that has transmitted the print job stores the job information of the print job.

In step S2504, it is determined whether or not transmission of the print job for which its turn for printing comes up to the printer becomes possible in the server. If it is possible, the print data is transmitted to the printer.

In step S2505, the printer analyzes the header of the received print job. If there is a manual-feed command) offline processing is performed. Furthermore, if the printer reaches an offline state, the server obtains the contents of the job information table within the printer and the contents of the panel message of the printer, and notifies the client of the IP address specified in the parameter of the panel message of an offline Notify command in which the job name and the number of pages are parameters. Specifically, offline notification is provided in a step similar to that in FIG. 21.

In step S2506, when the client receives the offline Notify command, the client obtains the job name and the number of pages, and provides an event notification if there is an application in which a dialogue display and an event notification are made. Specifically, the offline Notify command is received in a step similar to that in FIG. 22.

In step S2507, if the offline state is released by the user, a printing process is performed. The operation of the printer in steps S2506 and S2507 is performed in a step similar to that in FIG. 19.

In step S2508, when the server obtains the information that the printing process of the printer has been terminated, the job information within the server and the job information within the client are deleted in accordance with the instruction from the server.

The printing sequence such as that described above makes it possible to provide manual-feed notification to the client that has transmitted a print job without making an inquiry to the printer or the server from the client.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. An information processing apparatus, which communicates with a print apparatus that has functions that include manual-feed printing, and which generates a print job to be printed in the print apparatus, said information processing apparatus comprising:

accepting means for accepting a designation of manual-feed printing;

manual-feed printing designation command addition means for generating a print job to which a manual-feed printing designation command, which causes the print apparatus to be placed in an off-line state, is added, in a case in which said accepting means accepts the designation of manual-feed printing; and notification means for notifying a user that manual-feed printing may be performed, in a case in which the print apparatus has functions that include manual-feed printing.

2. An information processing apparatus according to claim 1, wherein said notification means notifies the user that manual-feed printing may be performed, in a case in which a notification that the print apparatus is in the off-line state is received.

3. An information processing apparatus according to claim 1, wherein the manual-feed printing designation command, which said manual-feed printing designation command addition means adds to the print job, includes name information of the print job.

4. An information processing apparatus according to claim 3, wherein said manual-feed printing designation command addition means adds information specifying said information processing apparatus to the manual-feed printing designation command.

5. A print apparatus, which performs functions that include manual-feed printing, and which performs printing based on a print job transmitted from an information processing apparatus, said print apparatus comprising:

print job accepting means for accepting a print job transmitted from the information processing apparatus;

print job analysis means for analyzing the accepted print job;

recording medium setting determination means for determining whether or not a recording medium is set in a manual-feed tray, in a case in which a manual-feed printing designation command, which causes said print apparatus to be placed in an off-line state in accordance with a result of said print job analysis means, is received;

recording medium using determination means for determining whether or not to use the recording medium set in the manual-feed tray, in a case in which it is determined that the recording medium is set in the manual-feed tray; and control means for causing said print apparatus to be placed in the off-line state, in a case in which it is determined that the recording medium is not set in the manual-feed tray or that the recording medium set in the manual-feed tray is not to be used.

6. A print apparatus according to claim 5, wherein said control means determines whether or not a user has resolved the off-line state, and executes printing in a case in which it is determined that the off-line state has been resolved.

7. A print apparatus according to claim 5, wherein the print job includes either a job name or an IP address as identification information, and wherein said print apparatus further comprises display means for displaying the identification information in a display unit provided in said print apparatus, in a case in which the manual-feed printing designation command is received.

8. A print apparatus according to claim 5, further comprising:

job information entry means for entering print job information to a job information table provided in said print apparatus, in a case in which the print job corresponding to the received manual-feed printing designation command is accepted.

9. A print apparatus according to claim 5, wherein said recording medium using determination means makes a determination as to whether or not to use the recording medium set in the manual-feed tray based on information selected in advance.

10. A print apparatus according to claim 5, wherein said recording medium using determination means determines whether or not to use the recording medium set in the manual-feed tray based on a command, which is designated together with the manual-feed print designation command, instructing whether or not to use the recording medium for the print job.

11. A print system comprising:
a print apparatus, which performs functions that include manual-feed printing; and
an information processing apparatus, which performs functions that include communicating with said print apparatus and generating a print job for printing in said print apparatus,
wherein said information processing apparatus comprises:
accepting means for accepting a designation of manual-feed printing;
manual-feed printing designation command addition means for generating a print job to which a manual-feed printing designation command, which causes said print apparatus to be placed in an off-line state, is added, in a case in which the accepting means has accepted the designation of manual-feed printing; and
notification means for notifying a user that said printing apparatus may perform manual-feed printing, in a case in which said print apparatus is in the off-line state, and
wherein said print apparatus comprises:
print job accepting means for accepting the print job transmitted from said information processing apparatus;
print job analysis means for analyzing the accepted print job; and
control means for causing said print apparatus to be placed in the off-line state, in a case in which the manual-feed printing designation command is received, based on an analysis result of the print job analysis means.

12. An information processing apparatus, which manages a status of a print apparatus, comprising:
obtaining means for obtaining status information of the print apparatus;
transmitting means for transmitting a print job, which is communicated from an external apparatus connected to the information processing apparatus, to the print apparatus;
determination means for determining whether or not the print apparatus, to which is transmitted the print job, is in an off-line state based on the status information, in a case in which the print job transmitted by said transmitting means includes data designating manual-feed printing; and
notification means for notifying the external apparatus that the print apparatus is in the off-line state, in a case in which said determination means determines that the print apparatus is in the off-line state.

13. An information processing apparatus according to claim 12, wherein said obtaining means obtains print job information, which is stored in the print apparatus, and an IP address of the external apparatus, from which is communicated the print job.

14. An information processing apparatus according to claim 13, wherein said notification means issues a notification to the external apparatus, which has an IP address obtained by said obtaining means.

15. An information processing apparatus according to claim 12, wherein information notified by said notification means includes a job name.

16. An information processing apparatus according to claim 12, further comprising storage means for storing the print job information.

17. An information processing apparatus according to claim 16, further comprising deletion means for deleting the print job information stored in said storage means, when said obtaining means obtains information indicating that a print and an output of the print job have been completed.

18. An information processing method of an information processing apparatus, which communicates with a print apparatus that has functions that include manual-feed printing, and which generates a print job to be printed in the print apparatus, said information processing method comprising:
an acceptance step of accepting a designation of manual-feed printing;
a manual-feed printing designation command addition step of generating a print job to which a manual-feed printing designation command, which causes the print apparatus to be placed in an off-line state, is added, in a case in which the designation of manual-feed printing is accepted in said acceptance step; and
a notification step of notifying a user that manual-feed printing may be performed, in a case in which the print apparatus has functions that include manual-feed printing.

19. An information processing method according to claim 18, wherein said notification step includes notifying the user that manual-feed printing may be performed, in a case in which a notification that the print apparatus is in the off-line state is received.

20. An information processing method according to claim 18, wherein the manual-feed printing designation command, which is added to the print job in said manual-feed printing designation command addition step, includes name information of the print job.

21. An information processing method according to claim 20, wherein said manual-feed printing designation command addition step includes adding information specifying the information processing apparatus to the manual-feed printing designation command.

22. A print method of a print apparatus, which performs functions that include manual-feed printing, and which performs printing based on a print job transmitted from an information processing apparatus, said print method comprising:
a print job acceptance step of accepting a print job transmitted from the information processing apparatus;
a print job analysis step of analyzing the accepted print job;
a recording medium setting determination step of determining whether or not a recording medium is set in a manual-feed tray, in a case in which a manual-feed printing designation command, which causes the print apparatus to be placed in an off-line state in accordance with a result of said print job analysis step, is received;
a recording medium using determination step of determining whether or not to use the recording medium set in the manual-feed tray, in a case in which it is determined that the recording medium is set in the manual-feed tray; and a control step of causing the print apparatus to be placed in the off-line state, in a case in which it is determined that the recording medium is not set in the manual-feed tray or that the recording medium set in the manual-feed tray is not to be used.

23. A print method according to claim 22, wherein said control step includes determining whether or not a user has resolved the off-line state, and executing printing in a case in which it is determined that the off-line state has been resolved.

24. A print method according to claim 22, wherein the print job includes either a job name or an IP address as identification information, and wherein said print method further comprises a display step of displaying the identification information in a display unit provided in the print apparatus, in a case in which the manual-feed printing designation command is received.

25. A print method according to claim 22, further comprising:

a job information entry step of entering print job information to a job information table provided in the print apparatus, in a case in which the print job corresponding to the received manual-feed printing designation command is accepted.

26. A print method according to claim 22, wherein said recording medium using determination step includes making a determination as to whether or not to use the recording medium set in the manual-feed tray based on information selected in advance.

27. A print method according to claim 22, wherein said recording medium using determination step includes determining whether or not to use the recording medium set in the manual-feed tray based on a command, which is designated together with the manual-feed print designation command, instructing whether or not to use the recording medium for the print job.

28. A print method of a print system that includes a print apparatus, which performs functions that include manual-feed printing, and an information processing apparatus, which performs functions that include communicating with the print apparatus and generating a print job for printing in the print apparatus, wherein said method comprises, at the information processing apparatus:

an acceptance step of accepting a designation of manual-feed printing;

a manual-feed printing designation command addition step of generating a print job to which a manual-feed printing designation command, which causes the print apparatus to be placed in an off-line state, is added, in a case in which the designation of manual-feed printing is accepted in said acceptance step; and a notification step of notifying a user that the printing apparatus may perform manual-feed printing, in a case in which the print apparatus is in the off-line state, and wherein said method comprises, at the print apparatus:

a print job acceptance step of accepting the print job transmitted from the information processing apparatus;

a print job analysis step of analyzing the accepted print job; and a control step of causing the print apparatus to be placed in the off-line state, in a case in which the manual-feed printing designation command is received, based on an analysis result of said print job analysis step.

29. An information processing method of an information processing apparatus that manages a status of a print apparatus, comprising:

an obtaining step of obtaining status information of the print apparatus;

a transmission step of transmitting a print job, which is communicated from an external apparatus connected to the information processing apparatus, to the print apparatus;

a determination step of determining whether or not the print apparatus, to which is transmitted the print job, is in an off-line state based on the status information, in a case in which the print job transmitted in said transmission step includes data designating manual-feed printing; and a notification step of notifying the external apparatus that the print apparatus is in the off-line state, in a case in which it is determined in said determination step that the print apparatus is in the off-line state.

30. An information processing method according to claim 29, wherein said obtaining step includes obtaining print job information, which is stored in the print apparatus, and an IP address of the external apparatus, from which is communicated the print job.

31. An information processing method according to claim 30, wherein said notification step includes issuing a notification to the external apparatus, which has an IP address obtained in said obtaining step.

32. An information processing method according to claim 29, wherein information notified in said notification step includes a job name.

33. An information processing method according to claim 29, further comprising a storage step of storing the print job information.

34. An information processing method according to claim 33, further comprising a deletion step of deleting the print job information stored in said storage step, when information indicating that a print and an output of the print job have been completed is obtained in said obtaining step.

35. A program product embodying a computer program for implementing an information processing method of an information processing apparatus, which communicates with a print apparatus that has functions that include manual-feed printing, and which generates a print job to be printed in the print apparatus, wherein the information processing method comprises:

an acceptance step of accepting a designation of manual-feed printing;

a manual-feed printing designation command addition step of generating a print job to which a manual-feed printing designation command, which causes the print apparatus to be placed in an off-line state, is added, in a case in which the designation of manual-feed printing is accepted in said acceptance step; and a notification step of notifying a user that manual-feed printing may be performed, in a case in which the print apparatus has functions that include manual-feed printing.

36. A program product according to claim 35, wherein said notification step includes notifying the user that manual-feed printing may be performed, in a case in which a notification that the print apparatus is in the off-line state is received.

37. A program product according to claim 35, wherein the manual-feed printing designation command, which is added to the print job in said manual-feed printing designation command addition step, includes name information of the print job.

38. A program product according to claim 37, wherein said manual-feed printing designation command addition step includes adding information specifying the information processing apparatus to the manual-feed printing designation command.

39. A program product embodying a computer program for implementing a print method of a print apparatus, which performs functions that include manual-feed printing, and which performs printing based on a print job transmitted from an information processing apparatus, wherein the print method comprises:

a print job acceptance step of accepting a print job transmitted from the information processing apparatus;

a print job analysis step of analyzing the accepted print job;

a recording medium setting determination step of determining whether or not a recording medium is set in a manual-feed tray, in a case in which a manual-feed printing designation command, which causes the print apparatus to be placed in an off-line state in accordance with a result of said print job analysis step, is received;

a recording medium using determination step of determining whether or not to use the recording medium set in the manual-feed tray, in a case in which it is determined that the recording medium is set in the manual-feed tray; and a control step of causing the print apparatus to be placed in the off-line state, in a case in which it is determined that the recording medium is not set in the manual-feed tray or that the recording medium set in the manual-feed tray is not to be used.

40. A program product according to claim 39, wherein said control step includes determining whether or not a user has resolved the off-line state, and executing printing in a case in which it is determined that the off-line state has been resolved.

41. A program product according to claim 39, wherein the print job includes either a job name or an IP address as identification information, and wherein said print method further comprises a display step of displaying the identification information in a display unit provided in the print apparatus, in a case in which the manual-feed printing designation command is received.

42. A program product according to claim 39, further comprising:

a job information entry step of entering print job information to a job information table provided in the print apparatus, in a case in which the print job corresponding to the received manual-feed printing designation command is accepted.

43. A program product according to claim 39, wherein said recording medium using determination step includes making a determination as to whether or not to use the recording medium set in the manual-feed tray based on information selected in advance.

44. A program product according to claim 39, wherein said recording medium using determination step includes determining whether or not to use the recording medium set in the manual-feed tray based on a command, which is designated together with the manual-feed print designation command, instructing whether or not to use the recording medium for the print job.

45. A program product embodying a computer program for implementing a print method of a print system that includes a print apparatus, which performs functions that include manual-feed printing, and an information processing apparatus, which performs functions that include communicating with the print apparatus and generating a print job for printing in the print apparatus, wherein the method comprises, at the information processing apparatus:

an acceptance step of accepting a designation of manual-feed printing;

a manual-feed printing designation command addition step of generating a print job to which a manual-feed printing designation command, which causes the print apparatus to be placed in an off-line state, is added, in a case in which the designation of manual-feed printing is accepted in said acceptance step; and a notification step of notifying a user that the printing apparatus may perform manual-feed printing, in a case in which the print apparatus is in the off-line state, and wherein the method comprises, at the print apparatus:

a print job acceptance step of accepting the print job transmitted from the information processing apparatus;

a print job analysis step of analyzing the accepted print job; and a control step of causing the print apparatus to be placed in the off-line state, in a case in which the manual-feed printing designation command is received, based on an analysis result of said print job analysis step.

46. A program product embodying a computer program for implementing an information processing method of an information processing apparatus that manages a status of a print apparatus, wherein the method comprises:

an obtaining step of obtaining status information of the print apparatus;

a transmission step of transmitting a print job, which is communicated from an external apparatus connected to the information processing apparatus, to the print apparatus;

a determination step of determining whether or not the print apparatus, to which is transmitted the print job, is in an off-line state based on the status information, in a case in which the print job transmitted in said transmission step includes data designating manual-feed printing; and a notification step of notifying the external apparatus that the print apparatus is in the off-line state, in a case in which it is determined in said determination step that the print apparatus is in the off-line state.

47. A program product according to claim 46, wherein said obtaining step includes obtaining print job information, which is stored in the print apparatus, and an IP address of the external apparatus, from which is communicated the print job.

48. A program product according to claim 47, wherein said notification step includes issuing a notification to the external apparatus, which has an IP address obtained in said obtaining step.

49. A program product according to claim 48, wherein information notified in said notification step includes a job name.

50. A program product according to claim 48, further comprising a storage step of storing the print job information.

51. A program product according to claim 50, further comprising a deletion step of deleting the print job information stored in said storage step, when information indicating that a print and an output of the print job have been completed is obtained in said obtaining step.

* * * * *

UNITED STATES PATENT AND TRADEMARK OFFICE
CERTIFICATE OF CORRECTION

PATENT NO. : 6,654,137 B1
DATED : November 25, 2003
INVENTOR(S) : Takashi Yagita It is certified that error appears in the above-identified patent and that said Letters Patent is hereby corrected as shown below:

Drawings,
Sheet 22, Fig. 25, "PAGE.AND" should read -- PAGE AND --.

Column 3,
Line 8, "placed an" should read -- placed in an --.
Line 38, "is made" should be deleted.

Column 4,
Line 16, "whet" should read -- when --.
Line 36, "when" should read -- which --.

Column 6,
Lines 9 and 22, "and" (first occurrence) should be deleted.

Column 7,
Line 43, "added, which" should read -- added, in which the --.
Line 44, "and which" should read -- and in which the --.

Column 9,
Line 52, "CPU/601" should read -- CPU 601 --.
Line 60, "a/network" should read -- a network --.

Column 11,
Lines 28 and 30, "SNPM" should read -- SNMP --.

Column 12,
Line 42, "calls," should read -- calls --.

Column 13,
Line 53, "When," should read -- ¶ When, --.

Column 14,
Line 40, "SNPM" should read -- SNMP --.

Column 16,
Line 9, "SNPM" should read -- SNMP --.

Column 17,
Line 17, "command)" should read -- command, --.

UNITED STATES PATENT AND TRADEMARK OFFICE
CERTIFICATE OF CORRECTION

PATENT NO. : 6,654,137 B1
DATED : November 25, 2003
INVENTOR(S) : Takashi Yagita It is certified that error appears in the above-identified patent and that said Letters Patent is hereby corrected as shown below:

Column 24,
Line 65, "claim 48," should read -- claim 46, --.

Column 25,
Line 1, "claim 48," should read -- claim 46, --.

Signed and Sealed this

Thirteenth Day of July, 2004

JON W. DUDAS
*Acting Director of the United States Patent and Trademark Office*